US011055649B1

(12) United States Patent
Sekar et al.

(10) Patent No.: US 11,055,649 B1
(45) Date of Patent: Jul. 6, 2021

(54) SYSTEMS AND METHODS RELATING TO CUSTOMER EXPERIENCE AUTOMATION

(71) Applicant: Genesys Telecommunications Laboratories, Inc., Daly City, CA (US)

(72) Inventors: Archana Sekar, Chennai (IN); Yochai Konig, Daly City, CA (US)

( * ) Notice: Subject to any disclaimer, the term of this patent is extended or adjusted under 35 U.S.C. 154(b) by 0 days.

(21) Appl. No.: 16/730,646

(22) Filed: Dec. 30, 2019

(51) Int. Cl.
| | |
|---|---|
| *G06Q 10/06* | (2012.01) |
| *G10L 15/18* | (2013.01) |
| *G06Q 10/10* | (2012.01) |
| *H04M 3/51* | (2006.01) |
| *H04L 12/58* | (2006.01) |
| *G10L 15/06* | (2013.01) |
| *G06Q 30/00* | (2012.01) |
| *G10L 15/22* | (2006.01) |
| *G06N 3/08* | (2006.01) |
| *G10L 15/16* | (2006.01) |

(52) U.S. Cl.
CPC ......... *G06Q 10/06316* (2013.01); *G06N 3/08* (2013.01); *G06Q 10/10* (2013.01); *G06Q 30/016* (2013.01); *G10L 15/063* (2013.01); *G10L 15/16* (2013.01); *G10L 15/1815* (2013.01); *G10L 15/22* (2013.01); *H04M 3/5191* (2013.01); *G10L 2015/223* (2013.01); *H04L 51/02* (2013.01); *H04L 51/16* (2013.01); *H04M 2203/552* (2013.01)

(58) Field of Classification Search
CPC ............ G06Q 10/06316; G06Q 30/016; H04L 51/16; H04M 2203/552; H04M 3/5191
USPC ....... 379/265.09, 266.1, 265.03, 265.05, 242
See application file for complete search history.

(56) References Cited

U.S. PATENT DOCUMENTS

| | | | |
|---|---|---|---|
| 2009/0144106 A1* | 6/2009 | Heinz .................... | G06Q 10/06 705/7.15 |
| 2010/0332287 A1* | 12/2010 | Gates ................. | G06Q 30/0203 705/7.32 |
| 2014/0025588 A1* | 1/2014 | Chinnappa ............. | G06Q 30/01 705/304 |
| 2014/0314225 A1 | 10/2014 | Riahi et al. | |
| 2015/0256677 A1 | 9/2015 | Konig et al. | |
| 2015/0347951 A1 | 12/2015 | Tamblyn et al. | |

(Continued)

OTHER PUBLICATIONS

PCT Search Report and Written Opinion of co-pending PCT application No. PCT/US2020/067311 dated Feb. 18, 2021.

(Continued)

*Primary Examiner* — Thjuan K Addy

(57) ABSTRACT

A computer-implemented method for automating actions for a customer in relation to an interaction between the customer and an agent of a contact center, the interaction including an exchange of statements made by the customer and agent. The method includes the steps of: receiving a transcript of the interaction; via a first analysis, analyzing the transcript; from results of the first analysis, identifying: a pending action, wherein the pending action is an action promised by the customer or agent that will be resolved after the interaction; and a target timeframe for resolving the pending action; given the pending action, determining a follow-up workflow that includes one or more follow-up actions, each of the one or more follow-up actions comprising an action intended to assist the customer to resolve the pending action; and automatically executing the one or more follow-up actions.

27 Claims, 9 Drawing Sheets

(56) References Cited

U.S. PATENT DOCUMENTS

| | | |
|---|---|---|
| 2017/0111509 A1 | 4/2017 | McGann et al. |
| 2017/0316438 A1 | 11/2017 | Konig et al. |
| 2018/0025360 A1* | 1/2018 | Gorny .................... G06Q 30/01 707/748 |
| 2019/0037007 A1 | 1/2019 | Gauthier et al. |
| 2019/0037077 A1 | 1/2019 | Konig et al. |

OTHER PUBLICATIONS

PCT Search Report and Written Opinion of co-pending PCT application No. PCT/US2020/067316 dated Mar. 25, 2021.
PCT Search Report and Written Opinion of co-pending PCT application No. PCT/US2020/067320 dated Apr. 7, 2021.

* cited by examiner

SYSTEMS AND METHODS RELATING TO CUSTOMER EXPERIENCE AUTOMATION

BACKGROUND

The present invention generally relates to telecommunications systems in the field of customer relations management including customer assistance via internet-based service options. More particularly, but not by way of limitation, the present invention pertains to systems and methods for automating the customer experience, including aspects of customer service offered through an application executed on a mobile computing device.

BRIEF DESCRIPTION OF THE INVENTION

The present invention may include a computer-implemented method for automating actions for a customer in relation to an interaction between the customer and an agent of a contact center, wherein the interaction includes an exchange of statements made by the customer and the agent. The method may include: receiving at least a transcript of the interaction; via a first analysis, analyzing the transcript of the interaction; from results of the first analysis, identifying: a pending action, wherein the pending action comprises an action promised by the customer or the agent that will be resolved after the interaction; and a target timeframe for resolving the pending action; given the pending action, determining a follow-up workflow that includes one or more follow-up actions, each of the one or more follow-up actions comprising an action intended to assist the customer to resolve the pending action; and automatically executing the one or more follow-up actions.

The present invention may include a system for automating actions for a customer in relation to an interaction between the customer and an agent of a contact center, wherein the interaction includes an exchange of statements made by the customer and statements made by the agent. The system may include: a hardware processor; and a machine-readable storage medium on which is stored instructions that cause the hardware processor to execute a process. The process may include the steps of: receiving at least a transcript of the interaction; via a first analysis, analyzing the transcript of the interaction; from results of the first analysis, identifying: a pending action, wherein the pending action comprises an action promised by the customer or the agent that will be resolved after the interaction; and a target timeframe for resolving the pending action; given the pending action, determining a follow-up workflow that includes one or more follow-up actions, each of the one or more follow-up actions comprising an action intended to assist the customer to resolve the pending action; and automatically executing the one or more follow-up actions.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
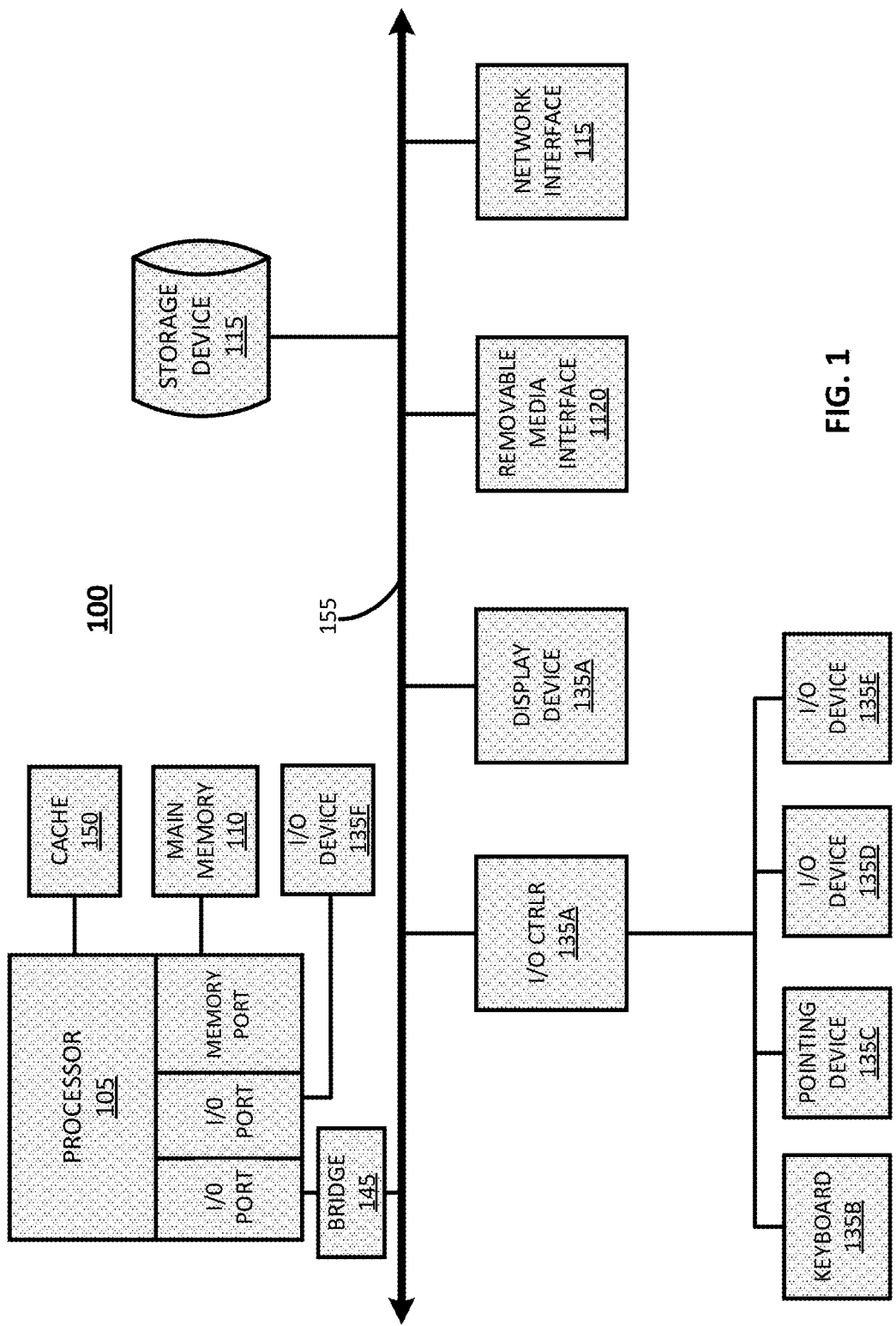
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily all referring to the same embodiment or example. Further, particular features, structures or characteristics may be combined in any suitable combinations and/or sub-combinations in one or more embodiments or examples.

Embodiments of the present invention may be implemented as an apparatus, method, or computer program product. Accordingly, example embodiments may take the form of an entirely hardware embodiment, an entirely software embodiment (including firmware, resident software, micro-code, etc.), or an embodiment combining software and hardware aspects that may all generally be referred to herein as a "module" or "system." Further, example embodiments may take the form of a computer program product embodied in any tangible medium of expression having computer-usable program code embodied in the medium. In addition, it will be appreciated that the figures provided herewith are for explanation purposes to persons ordinarily skilled in the art and that the drawings are not necessarily drawn to scale.

It will be further appreciated that the flowchart and block diagrams provided in the figures illustrate architecture, functionality, and operation of possible implementations of systems, methods, and computer program products according to example embodiments of the present invention. In this regard, each block in the flowchart or block diagrams may represent a module, segment, or portion of code, which comprises one or more executable instructions for implementing the specified logical functions. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Exemplary Computing Device

Turning now to FIG. 1, a schematic block diagram of an exemplary computing device 100 is shown in accordance with embodiments of the present invention and/or with which exemplary embodiments of the present invention may be enabled or practiced. It should be appreciated that FIG. 1 is provided as a non-limiting example.

The computing device 100, as used herein, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers) may be implemented via one or more of the computing devices 100. For example, the various servers may be a process or thread running on one or more processors of one or more computing devices 100 executing computer program instructions and interacting with other system components for performing the various functionalities described herein. A server also may be a software module, for example, a software module of the contact center 200 depicted in FIG. 2 may include one or more servers. Further, unless otherwise specifically limited, the functionality described in relation to a plurality of computing devices may be integrated into a single computing device 100, or the functionality described in relation to a single computing device may be distributed across several computing devices 100. In relation to computing systems described herein, such as the contact center 200 of FIG. 2, the various servers and computer systems thereof may be located on one or more local computing devices 100 (i.e., on-site at the same physical location as the agents of the contact center) or may be located on one or more remote computing devices 100 (i.e., off-site or in the cloud in a geographically different location, for example, in a remote data center connected to the contact center via a network). In exemplary embodiments, functionality provided by servers located on computing devices off-site may be accessed and provided over a virtual private network (VPN) as if such servers were on-site, or the functionality may be provided using a software as a service (SaaS) to provide functionality over the Internet using various protocols, such as by exchanging data using encoded in extensible markup language (XML) or JSON.

Though other configurations are also possible, in the illustrated example, the computing device 100 include a central processing unit (CPU) or processor 105 and a main memory 110. The computing device 100 also includes a storage device 115, a removable media interface 120, a network interface 115, one or more input/output (I/O) devices 135, which as depicted includes an I/O controller 130, a display device 135A, a keyboard 135B, and a pointing device 135C (e.g., a mouse). The storage device 115 may provide storage for an operating system and software run on the computing device. The computing device 100 further includes additional optional elements, such as a memory port 140, a bridge 145, one or more additional input/output devices 135D, 135E, 135F, and a cache memory 150 in communication with the processor 105.

The processor 105 of the computing device 100 may be any logic circuitry that responds to and processes instructions fetched from the main memory 110. It may be implemented, for example, in an integrated circuit, in the form of a microprocessor, microcontroller, or graphics processing unit, or in a field-programmable gate array (FPGA) or application-specific integrated circuit (ASIC). The main memory 110 may be one or more memory chips capable of storing data and allowing any storage location to be directly accessed by the central processing unit 105. Though other configurations are possible, as shown in the illustrated example, the central processing unit 105 may communicate directly with the main memory 110 via a memory port 140 and indirectly with the storage device 115 via a system bus 155.

In exemplary embodiments, the processor 105 may include a plurality of processors and may provide functionality for simultaneous execution of instructions or for simultaneous execution of one instruction on more than one piece of data. The computing device 100 may include a parallel processor with one or more cores. The computing device 100 may include a shared memory parallel device, with multiple processors and/or multiple processor cores, accessing all available memory as a single global address space. In another embodiment, the computing device 100 may be a distributed memory parallel device with multiple processors each accessing local memory only. The computing device 100 may have both some memory which is shared and some which may only be accessed by particular processors. The processor 105 may include a multicore microprocessor, which combines two or more independent processors into a single package, e.g., into a single integrated circuit (IC). In exemplary embodiments, the processor 105 may provide single instruction multiple data (SIMD) functionality. In another embodiment, several processors in the processor 105 may provide functionality for execution of multiple instructions simultaneously on multiple pieces of data (MIMD).

As depicted in FIG. 1, the processor 105 may communicate directly with the cache memory 150 via a secondary bus or backside bus. In other embodiments, the processor 105 communicates with the cache memory 150 using the system bus 155. The cache memory 150 typically has a faster response time than main memory 110. As illustrated, the processor 105 may communicate with various I/O devices 135 via the local system bus 155, though direct communication though backside buses are also possible. Various buses may be used as the local system bus 155 in accordance with conventional technology. For embodiments in which an I/O device is a display device 135A, the processor 105 may communicate with the display device 135A through an advanced graphics port (AGP).

A wide variety of I/O devices 135 may be present in the computing device 100. Input devices may include one or more keyboards 135, mice, trackpads, trackballs, microphones, and drawing tablets, to name a few non-limiting examples. Output devices may include video display devices, speakers and printers. An I/O controller 130 may be used to control the I/O devices, such as, for example, as a keyboard 135B and a pointing device 135C (e.g., a mouse or optical pen).

The computing device 100 may support one or more removable media interfaces 120, such as a floppy disk drive, a CD-ROM drive, a DVD-ROM drive, tape drives of various formats, a USB port, or any other device suitable for reading data from read-only media, or for reading data from, or writing data to, read-write media. The removable media interface 120, for example, may be used for installing software and programs. The computing device 100 may further include a storage device 115, such as one or more hard disk drives or hard disk drive arrays, for storing an operating system and other related software. Optionally, a removable media interface 120 may also be used as the storage device.

The computing device 100 may include or be connected to multiple display devices 135A. As such, any of the I/O devices 135 and/or the I/O controller 130 may include any type and/or form of suitable hardware, software, or combination of hardware and software to support, enable or provide for the connection to, and use of, the multiple display devices 135A by the computing device 100. For example, the computing device 100 may include any type and/or form of video adapter, video card, driver, and/or library to interface, communicate, connect or otherwise use the multiple display devices 135A. In exemplary embodiments, a video adapter may include multiple connectors to interface to multiple display devices 135A. In another embodiment, the computing device 100 may include multiple video adapters, with each video adapter connected to one or more of the display devices 135A. In other embodiments, one or more of the display devices 135A may be provided by one or more other computing devices, connected, for example, to the computing device 100 via a network. These embodiments may include any type of software designed and constructed to use the display device of another computing device as a second display device 135A for the computing device 100. One of ordinary skill in the art will recognize and appreciate the various ways and embodiments that a computing device 100 may be configured to have multiple display devices 135A.

The computing device 100 may operate under the control of an operating system, which controls scheduling of tasks and access to system resources. The computing device 100 may run any operating system, embedded operating system, real-time operating system, open source operation system, proprietary operating system, mobile device operating system, or any other operating system capable of running on a computing device and performing the operations described herein. The computing device 100 may be any workstation, desktop computer, laptop or notebook computer, server machine, handled computer, mobile telephone, smart phone, portable telecommunication device, media playing device, gaming system, mobile computing device, or any other type and/or form of computing, telecommunications or media device that is capable of communication and that has sufficient processor power and memory capacity to perform the operations described herein. In exemplary embodiments, the computing device 100 may have different processors, operating systems, and input devices consistent with the device. In certain embodiments, the computing device 100 is a mobile device. In exemplary embodiments, the computing device 100 may include a combination of devices, such as a mobile phone combined with a digital audio player or portable media player.

The computing device 100 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In exemplary embodiments, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 100 communicates with other computing devices 100 via any type and/or form of gateway or tunneling protocol such as secure socket layer (SSL) or transport layer security (TLS). The network interface may include a built-in network adapter, such as a network interface card, suitable for interfacing the computing device to any type of network capable of communication and performing the operations described herein. As discussed more below, aspects of the computing device 100 may include components, serves, or other modules that are a cloud-based or implemented within a cloud computing environment In exemplary embodiments, a network environment may be a virtual network environment where the various network components are virtualized. For example, the various machines may be virtual machines implemented as a software-based computer running on a physical machine. The virtual machines may share the same operating system or, in other embodiments, different operating system may be run on each virtual machine instance. In exemplary embodiments, a "hypervisor" type of virtualizing is used where multiple virtual machines run on the same host physical machine, each acting as if it has its own dedicated box. The virtual machines may also run on different host physical machines. Other types of virtualization are also contemplated, such as, for example, the network (e.g., via software defined networking (SDN)). Functions, such as functions of a session border controller, may also be virtualized, such as, for example, via network functions virtualization (NFV).

Contact Centers

Figure 2:
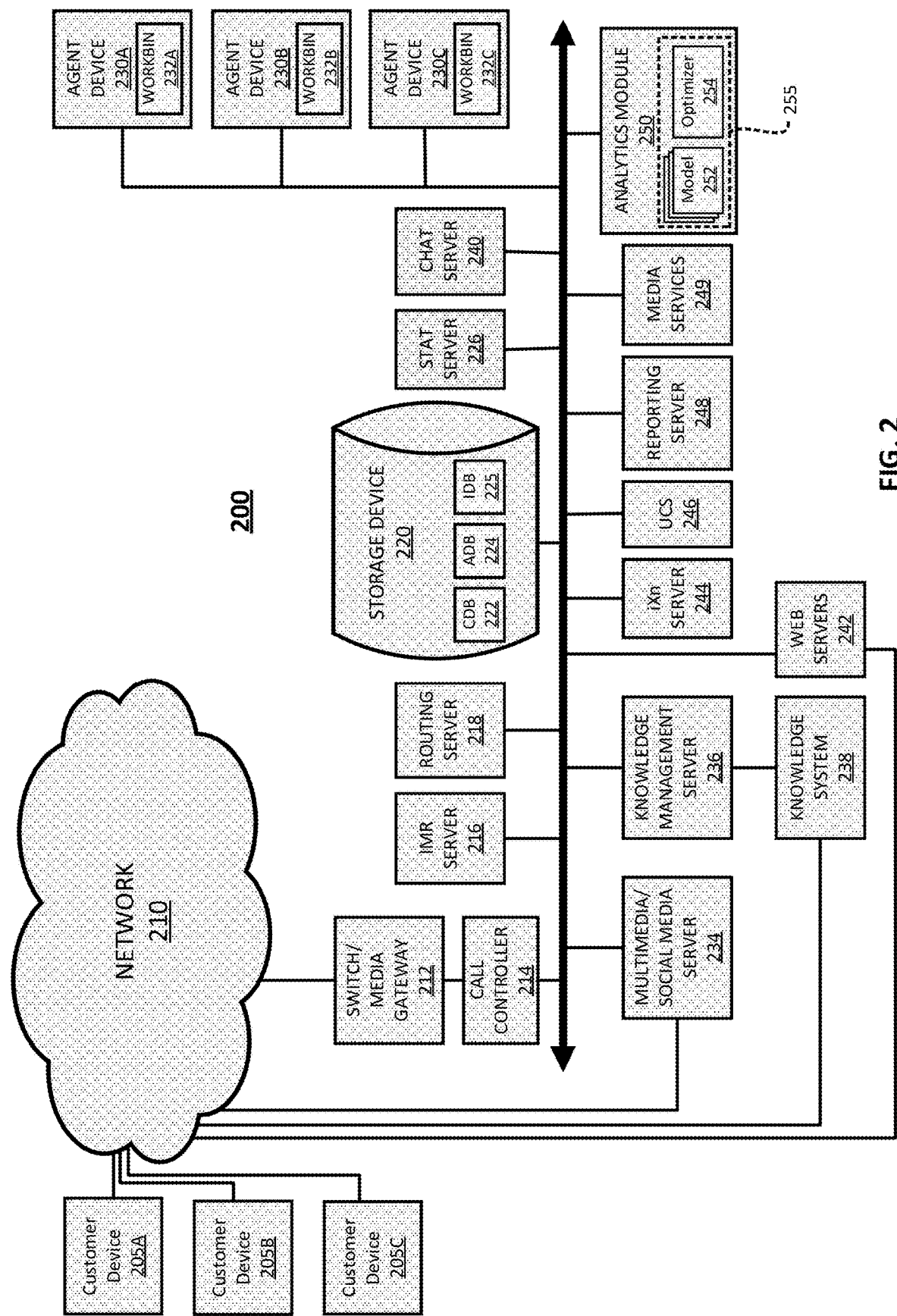
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or customer service contact center (hereinafter "contact center") 200 is shown in accordance with exemplary embodiments of the present invention and/or with which exemplary embodiments of the present invention may be enabled or practiced.

By way of background, customer service providers generally offer many types of services through contact centers. Such contact centers may be staffed with employees and/or customer service agents (or simply "agents"), with the agents serving as an interface between an organization, such as a company, enterprise, or government agency, and persons, such as users or customers (hereinafter generally referred to as "customers"). For example, the agents at a contact center may assist customers in making purchasing decisions and receive purchase orders. Similarly, agents may assist or support customers in solving problems with products or services already provided by the organization. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), or through other media.

Operationally, contact centers generally strive to provide quality services to customers, while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. As a result, customer service providers are increasingly relying on automated processes to interact with customers.

However, while such automation technology is now commonly used by contact centers to increase efficiency, it remains far less developed for use by customers. Thus, while IVR systems, IMR systems, and/or bots are used to automate portions of the interaction on the contact center side of the interaction, the actions on the customer-side are still left for the customer to perform manually. As will be seen, embodiments of the present invention relate to systems and methods for automating aspects of the customer-side of the interactions between customers and customer service providers or contact centers. Accordingly, present embodiments may provide ways to automate actions that customers are required to perform when contacting and interacting with customer service providers or contact centers. For example, embodiments of the present invention include methods and systems for identifying outstanding matters or pending actions for a customer that need additional attention stemming from a previous interaction between the customer and a contact center. Once identified, other embodiments may include methods and systems for automating follow-up actions on behalf of the customer for resolving such pending actions.

Referring specifically to FIG. 2, a block diagram is presented that illustrates an embodiment of a communication infrastructure or contact center 200 in accordance with the present invention and/or an environment within which embodiments of the present invention may be enabled or practiced. The contact center 200 may be used by a customer service provider to provide various types of services to customers. For example, the contact center 200 may be used to engage and manage chat conversations in which automated chat robots or bots and/or human agents communicate with customers. As will be appreciated, the contact center 200 may be used as an in-house facility to a business or enterprise for serving the enterprise in performing the functions of sales and service relative to the products and services available through the enterprise. In another aspect, the contact center 200 may be operated by a third-party service provider. According to another embodiment, the contact center 200 may operate as a hybrid system in which some components are hosted at the contact center premise while other components are hosted remotely (e.g., in a cloud-based or cloud computing environment). The contact center 200 may be deployed on equipment dedicated to the enterprise or third-party service provider, and/or deployed in a remote computing environment such as, for example, a private or public cloud environment with infrastructure for supporting multiple contact centers for multiple enterprises. As discussed more below, the contact center 200 may include software applications or programs, which may be executed on premises or remotely or some combination thereof. It should further be appreciated that the various components of the contact center 200 may also be distributed across various geographic locations and computing environments and not necessarily contained in a single location, computing environment, or even computing device.

Further, it should be generally noted that, unless otherwise specifically limited, any of the computing elements of present invention may be implemented in cloud-based or cloud computing environments. As used herein, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Also often referred to as a "serverless architecture", a cloud computing (or simply "cloud") execution model generally includes a service provider dynamically managing an allocation and provisioning of remote servers for achieving a desired functionality. It will be appreciated that such "serverless" platforms still require servers.

In accordance with the exemplary embodiment of FIG. 2, the components or modules of the contact center 200 may include: a plurality of customer devices 205A, 205B, 205C; a communications network 210 (also referred to simply as network 210); a switch/media gateway 212; a call controller 214; an interactive media response (IMR) server 216; a routing server 218; a storage device 220; a statistics or stat server 226; a plurality of agent devices 230A, 230B, 230C that include workbins 232A, 232B, 232C, respectively; a multimedia/social media server 234; a knowledge management server 234 coupled to a knowledge system 238; a chat server 240, web servers 242; an interaction (iXn) server 244; a universal contact server (UCS) 246; a reporting server 248; media services 249; and an analytics module 250. As will be seen, the contact center 200 manages resources (e.g., personnel, computers, telecommunication equipment, etc.) to enable delivery of services via telephone, email, chat, or other communication mechanisms. Such services may vary depending on the type of contact center and range from customer service to help desk, emergency response, telemarketing, order taking, etc.

For example, in accordance with an embodiment, customers desiring to receive services from the contact center 200 may initiate inbound communications (e.g., telephone calls, emails, chats, etc.) to the contact center 200 via a customer device 205. While FIG. 2 shows three such customer devices—i.e., customer devices 205A, 205B, and 205C—it should be understood that any number may be present. Each of the customer devices 205 may be a communication device conventional in the art, such as a telephone, wireless phone, smart phone, personal computer, electronic tablet, or laptop, to name some non-limiting examples. In general, the customer devices 205 are used by customers to initiate, manage, and respond to telephone calls, emails, chats, text messages, web-browsing sessions, and other multi-media transactions in accordance with any of the functionality described herein. For example, a customer may use a customer device 205 to contact the contact center 200 by way of a chat channel with the text being transmitted to a chatbot or human agent. A response from the chatbot or human agent may be generated and delivered to the customer device 205 as text.

Inbound and outbound communications from and to the customer devices 205 may traverse the network 210, with the nature of network depending on the type of customer device being used and form of communication. As an example, the network 210 may include a communication network of telephone, cellular, and/or data services and may also comprise a private or public switched telephone network (PSTN), local area network (LAN), private wide area network (WAN), and/or public WAN such as the Internet. The network 210 may also include a wireless carrier network including a code division multiple access (CDMA) network, global system for mobile communications (GSM) network, or any wireless network/technology conventional in the art, including but not limited to 3G, 4G, LTE, etc.

Embodiments of the contact center 200 may include a switch/media gateway 212 coupled to the network 210 for receiving and transmitting telephone calls between the customers and the contact center 200. The switch/media gateway 212 may include a telephone switch or communication switch configured to function as a central switch for agent level routing within the center. The switch may be a hardware switching system or a soft switch implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephone or communication device. In this example, the switch/media gateway establishes a voice path/connection between the calling customer and the agent telephone device, by establishing, for example, a connection between the customer's telephone device and the agent telephone device.

In exemplary embodiments, the switch is coupled to a call controller 214 which, for example, serves as an adapter or interface between the switch and the remainder of the routing, monitoring, and other communication-handling components of the contact center. The call controller 214 may be configured to process PSTN calls, VoIP calls, etc. For example, the call controller 214 may include computer-telephone integration (CTI) software for interfacing with the switch/media gateway and contact center equipment. In exemplary embodiments, the call controller 214 may include a session initiation protocol (SIP) server for processing SIP calls. The call controller 214 may also extract data about the customer interaction, such as the caller's telephone number (e.g., the automatic number identification (ANI) number), the customer's internet protocol (IP) address, or email address, and communicate with other components of the contact center 200 in processing the interaction.

Embodiments of the contact center 200 may include an interactive media response (IMR) server 216. The IMR server 216 may also be referred to as a self-help system, a virtual assistant, etc. The IMR server 216 may be similar to an interactive voice response (IVR) server, except that the IMR server 216 is not restricted to voice and additionally may cover a variety of media channels. In an example illustrating voice, the IMR server 216 may be configured with an IMR script for querying customers on their needs. For example, a contact center for a bank may tell customers via the IMR script to 'press 1' if they wish to retrieve their account balance. Through continued interaction with the IMR server 216, customers may be able to complete service without needing to speak with an agent. The IMR server 216 may also ask an open-ended question such as, "How can I help you?" and the customer may speak or otherwise enter a reason for contacting the contact center. The customer's response may be used by a routing server 218 to route the call or communication to an appropriate contact center 200 resource.

For example, if the communication is to be routed to an agent, the call controller 214 may interact with the routing server (also referred to as an orchestration server) 218 to find an appropriate agent for processing the interaction with the particular customer. The selection of an appropriate agent for routing an inbound customer interaction may be based, for example, on a routing strategy employed by the routing server 218, and further based on stored information about the customer and agents (which, as described more below, may be maintained in customer and agent databases on the storage device 220) and other routing parameters provided, for example, by the statistics server 226, which aggregates data relating to the performance of the contact center 200. The routing server 218, for example, may query such data via an ANI. Thus, in general, the routing server 218 may query data relevant to an incoming interaction for facilitating the routing of that interaction to the most appropriate contact center.

Regarding data storage, the contact center 200 may include one or more mass storage devices—represented generally by the storage device 220—that stores one or more databases of data deemed relevant to the functioning of the contact center 200. For example, the storage device 220 may store customer data that is maintained in a customer database (also CDB) 222. Customer data maintained by the contact center 200 may include customer profiles, contact information, service level agreement (SLA), and interaction history (e.g., details of each previous interaction with a customer, including nature of previous customer contacts, reason for the interaction, disposition data, wait time, handle time, and actions taken by the contact center to resolve customer issues). As another example, the storage device 220 may store agent data in an agent database (also ADB) 223. Agent data maintained by the contact center 200 may include agent availability, profiles, schedules, skills, etc. As another example, the storage device 220 may store interaction data in an interaction database (also IDB) 224. Interaction data may include data relating to numerous past interactions between customers and contact centers. More generally, it should be understood that, unless otherwise specified, the storage device 220 is configured to include databases and/or store data related to any of the types of information described herein, with those databases and/or data being accessible to the other modules or servers of the contact center 200 in ways that facilitate the functionality described herein. For example, the servers or modules of the contact center 200 may query the databases for retrieving particular data stored therewithin as well as transfer data to the databases for storage thereon. The storage device 220, for example, may take the form of a hard disk, disk array, or any other storage medium as is conventional in the art. The storage device 220 may be included as part of the contact center 200 or operated remotely by a third party. The databases, for example, may be Cassandra or any NoSQL database. The databases may also be a SQL database and be managed by any database management system, such as, for example, Oracle, IBM DB2, Microsoft SQL server, Microsoft Access, PostgreSQL, etc., to name a few non-limiting examples.

In exemplary embodiments, the agent devices 230 are configured to interact with the various components and modules of the contact center 200 in ways that facilitate the functionality described herein. For example, the agent devices 230 may include a telephone adapted for regular telephone calls, VoIP calls, etc. The agent device 230 may further include a computer for communicating with one or more servers of the contact center 200 and performing data processing associated with contact center operations, as well as for interfacing with customers via voice and other multimedia communication mechanisms pursuant to described functionality. While FIG. 2 shows three such agent devices—i.e., agent devices 230A, 230B and 230C—it should be understood that any number may be present.

Once it is determined that an inbound communication should be handled by a human agent, functionality within the routing server 218 may select an agent from those available for routing the communication thereto. As already discussed, this selection may be based on which agent is best suited for handling the inbound communication. Once the appropriate agent is selected, the contact center 200 forms a connection between the customer device 205 and the agent device 230 that corresponds to the selected agent. As part of this connection, information about the customer and/or the customer's history may be provided to the selected agent via his/her agent device 230. This information generally includes data that may aid the selected agent to better service the customer.

According to an embodiment, the contact center 200 may include a multimedia/social media server 234 for engaging in media interactions other than voice interactions with the customer devices 205 and/or web servers 242. The media interactions may be related, for example, to email, vmail (voice mail through email), chat, video, text-messaging, web, social media, co-browsing, etc. The multi-media/social media server 234 may take the form of any IP router conventional in the art with specialized hardware and software for receiving, processing, and forwarding multi-media events.

Embodiments of the contact center 200 may include a knowledge management server 234 for facilitating interactions between customers operating the customer devices 205 and a knowledge system 238. The knowledge system 238 may be included as part of the contact center 200 or operated remotely by a third party. In general, the knowledge system 238 may be a computer system capable of receiving questions or queries and providing answers in response. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson®, though other types of systems also may be used. Additional details of the knowledge management server and knowledge system are provided in U.S. application Ser. No. 14/449,018, filed on Jul. 31, 2014, entitled "System and Method for Controlled Knowledge System Management," the content of which is incorporated herein by reference.

According to an embodiment, the contact center 200 may include a chat server 240 for conducting and managing electronic chat communications with customers operating customer devices 205. As will be seen, chat communications may be conducted by the chat server 240 in such a way that a customer communicates with both automated systems, which may also be referred to as chatbots, as well as human agents, which may also be referred to simply as agents. According to an embodiment, the chat server 240 may be configured to implement and maintain chat conversations, generate chat transcripts, and determine whether a chat communication is completed (e.g., based on timeout or by a customer closing a chat window). In exemplary embodiments, the chat server 240 may also operate as a chat orchestration server, dispatching actual chat conversations among the chatbots or available human agents. The processing logic of the chat server 240 may be rules driven, and leverage, for example, intelligent workload distribution protocols and various business rules for routing communications. The chat server 240 further may implement, manage and facilitate user interfaces (also UIs) associated with the chat feature, including those UIs generated at either the customer device 205 or the agent device 230. Further, the chat server 240 may orchestrate and implement chats conducted by both human agents and automated chatbots. According to an embodiment, the chat server 240 is configured to transfer chats within a single chat session with a particular customer between automated and human sources such that, for example, a chat session transfers from a chatbot to a human agent or from a human agent to a chatbot.

The chat server 240 may also be coupled to the knowledge management server 234 and the knowledge systems 238 for receiving suggestions and answers to queries posed by customers during an automated chat, providing links to knowledge articles, or the like. Additionally, the chat server 240 may be configured to facilitate (e.g., supervise and coordinate) self-learning by certain of the chatbots. For example, prior to characteristics of individual chatbots being modified, the chat server 240 may determine whether the feedback from customer that precipitated the modification is suspicious or malicious (e.g., by searching for or identifying key words or phrases, and/or flagging potential issues for review by an agent). Although the chat server 240 is depicted in the embodiment of FIG. 2 as being a separate server component, a person of skill in the art should recognize that functionalities of the chat server 240 may be incorporated into other servers, such as, for example, the multimedia/social media server 234 or the IMR server 216.

According to an embodiment, the web servers 242 may include social interaction site hosts for a variety of known social interaction sites to which a customer may subscribe, such as Facebook, Twitter, Instagram, etc., to name a few non-limiting examples. In exemplary embodiments, although web servers 242 are depicted as part of the contact center 200, the web servers 242 may also be provided by third parties and/or maintained outside of the contact center premise. The web servers 242 may also provide web pages for the enterprise that is being supported by the contact center 200. Customers may browse the web pages and get information about the enterprise's products and services.

The web pages may also provide a mechanism for contacting the contact center via, for example, web chat, voice call, email, web real-time communication (WebRTC), etc. For example, widgets may be deployed on the websites hosted on the web servers 242. As used herein, a widget refers to a user interface component that performs some particular function. In some implementations, a widget may include a graphical user interface control that can be overlaid on a web page displayed on the Internet. The widget may show information, such as in a window or text box, and/or include buttons or other controls that allow the customer to access certain functionalities such as sharing or opening a file. In some implementations, a widget is a common looking user interface component having a portable portion of code that can be installed and executed within a separate web-based page without compilation. Some components can include corresponding and/or additional user interfaces and can access a variety of resources such as local resources (e.g., a calendar, contact information, etc. on the customer device) and/or remote network resources (e.g., instant messaging, electronic mail, social networking updates, etc.).

In addition, embodiments of the contact center 200 may be configured to manage deferrable interactions or activities (also referenced simply as deferrable activities) and the routing thereof to human agents for completion. As should be understood, deferrable activities include back-office work that can be performed off-line, examples of which include responding to emails, letters, attending training, and other activities that do not entail real-time communication with a customer. To do this, the interaction (iXn) server 244 is configured to interact with the routing server 218 for selecting an appropriate agent to handle each of the deferable activities. Once assigned to a particular agent, the deferable activity is pushed to that agent, for example, appearing on the agent device 230 of the selected agent. As an example, the deferable activity appear in a workbin 232 as a task for the selected agent to complete. The functionality of the workbin 232 may be implemented via any conventional data structure, such as, for example, a linked list, array, etc. Each of the agent devices 230 may include a workbin 232, thus, workbins 232A, 232B, and 232C may be maintained in the agent devices 230A, 230B, and 230C, respectively. As an example, a workbin 232 may be maintained in the buffer memory of the corresponding agent device 230.

According to an embodiment, the contact center 200 may include a universal contact server (UCS) 246, which is configured to retrieve information stored in the customer database 222 and direct information for storage therein. For example, the UCS 246 may be utilized as part of the chat feature to facilitate maintaining a history on how well chats for a particular customer were handled, which then may be used as a reference for future chat communications. The UCS 246 also may be configured to facilitate maintaining a history of customers' preferences regarding media channels, such as instances in which chat communications are acceptable and instances in which customers prefer alternate media channels. Additionally, the UCS 246 may be configured to record an interaction history for each customer, capturing and storing data regarding comments from agents, customer communication history, and the like. Each of these data types may be stored on the customer database 222 or on other modules as described functionality requires.

Example embodiments of the contact center 200 may further include a reporting server 248 configured to generate reports from data aggregated by the statistics server 226. Such reports may include near real-time reports or historical reports concerning the state of resources, such as, for example, average wait time, abandonment rate, agent occupancy, etc. The reports may be generated automatically or in response to specific requests from a requestor (e.g., agent, administrator, contact center application, etc.).

According to an embodiment, the media services 249 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

According to an embodiment, the analytics module 250 may provide systems and methods for performing analytics on interaction data from a plurality of different data sources such as different applications associated with a contact center or an organization. Aspects of embodiments of the present invention are also directed to generating, updating, training, and modifying predictors or models 252 based on collected interaction data. The models 252 may include behavior models of customers or agents. The behavior models may be used to predict behaviors of, for example, customers or agents, in a variety of situations, thereby allowing embodiments of the present invention to tailor interactions based on the predictions or to allocate resources in preparation for predicted characteristics of future interactions, and thereby improving overall performance, including improving the customer experience. It will be appreciated that, while the analytics module 250 is depicted as being part of a contact center, such behavior models may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which may store data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). As discussed more below, the analytic module 250 may be further configured to retrieve data stored within the storage device 220 for use in developing and training algorithms and models 252, for example, by applying machine learning techniques.

One or more of the models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are not available or easily derived, it is generally preferred to build an empirical model based upon collected and stored data. To properly capture the relationship between the manipulated/disturbance variables and the controlled variables of complex systems, the models 252 preferably are nonlinear. This is because nonlinear models can represent curved rather than straight-line relationships between manipulated/disturbance variables and controlled variables, which are common to complex systems such as those discussed herein. Given the foregoing requirements, a neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. As stated, the models 252 preferably are a non-linear model. Accordingly, the optimizer 254 may be a nonlinear programming optimizer. However, it is contemplated that the present invention may be implemented by using, individually or in combination, a variety of different types of optimization approaches. These optimization approaches include, but not limited to, linear programming, quadratic programming, mixed integer nonlinear programming, stochastic programming, global nonlinear programming, genetic algorithms, and particle/swarm techniques.

According to exemplary embodiments, the models 252 and the optimizer 254 may together be used as an optimization system 255. For example, the analytics module 250 may utilize the optimization system 255 as part of an optimization process by which so aspect of contact center performance and operational is enhanced or optimized, for example, aspects related to the customer experience, the agent experience, routing, function of automated processes, etc.

The various components, modules, and/or servers of FIG. 2 (as well as the other figures included herein) may each include one or more processors executing computer program instructions and interacting with other system components for performing the various functionalities described herein. The computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As noted above, the contact center 200 may operate as a hybrid system in which some or all components are hosted remotely, such as in a cloud-based or cloud computing environment.

Chat Systems

Figure 3:
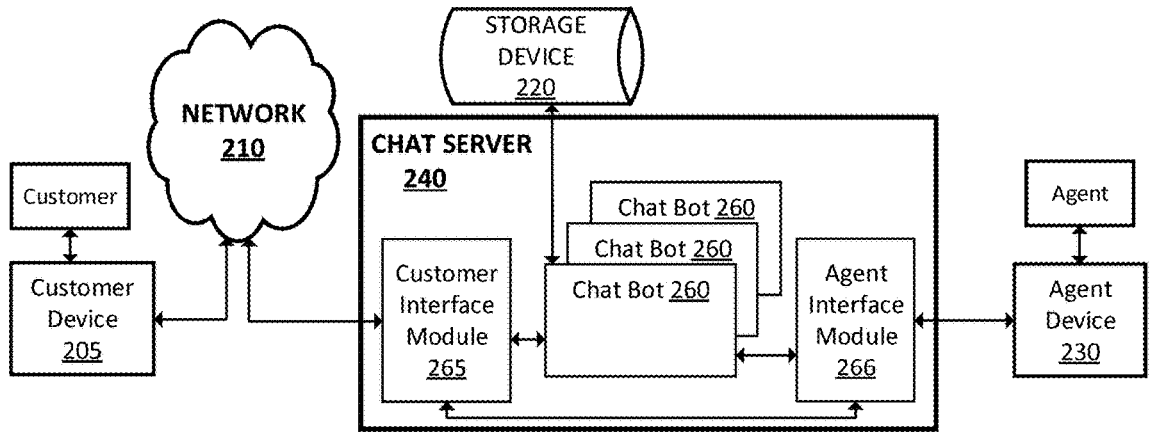
FIG. 3 is schematic block diagram showing further details of a chat server operating as part of the chat system according to embodiments of the present invention.
Figure 4:
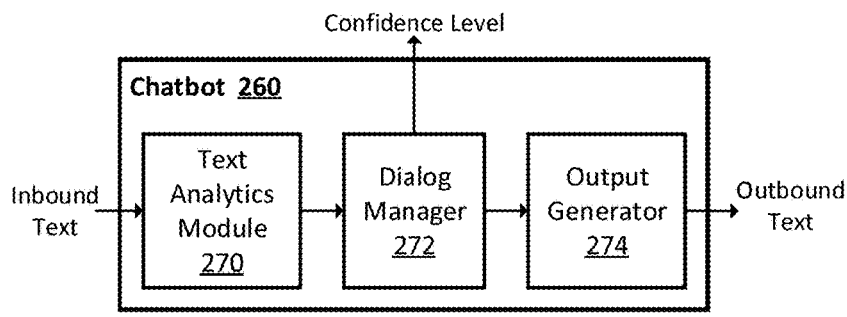
FIG. 4 is a schematic block diagram of a chat module according to embodiments of the present invention.
Figure 5:
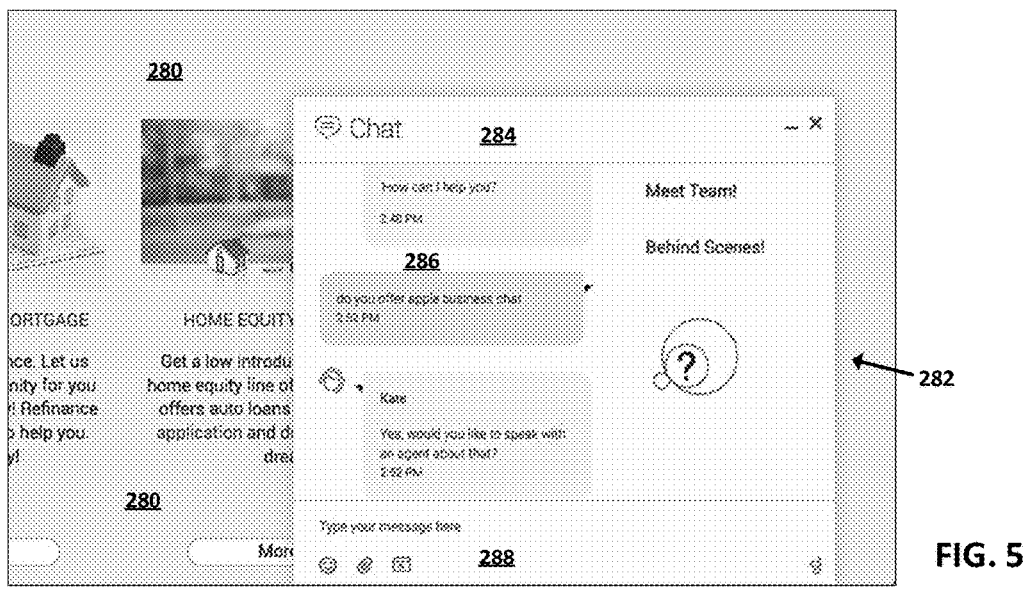
FIG. 5 is an exemplary customer chat interface according to embodiments of the present invention.

Turning to FIGS. 3, 4 and 5, various aspects of chat features and systems are discussed, as may be utilized in exemplary embodiments of the present invention. As will be seen, the present invention may include or be enabled by a chat feature by which textual messages are exchanged between different parties, where those parties may include live persons, such as customers and agents, as well as automated processes, such as bots or chatbots. In general, a bot (also known as an Internet bot, is a software application that runs automated tasks or scripts over the Internet. Typically, bots perform tasks that are both simple and structurally repetitive, at a much higher rate than would be possible for a human alone. A chatbot is a particular type of bot and, as used herein, is defined as a piece of software that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, but many simpler ones scan for keywords within the input, then pull a reply with the most matching keywords, or the most similar wording pattern, from a database. Chatbots can be classified into usage categories such as conversational commerce (e-commerce via chat), analytics, communication, customer support, social, travel, etc.

The chat features and systems are presented generally with reference to exemplary embodiments of a chat server, chatbot, and chat interface illustrated, respectively, in FIGS. 3, 4, and 5. While these examples are provided with respect to a chatbot implemented on the contact center side, it should be understood that such a chatbot may be modified toward implementation on the customer-side. Accordingly, as discussed more below, it should be appreciated that the exemplary chat systems of FIGS. 3, 4, and 5 may be modified by one skilled in the art for analogous use on the customer-side of interactions with contact centers. It will be appreciated that, as provided herein, chatbots may be utilized by voice communications via converting text-to-speech and/or speech-to-text.

Referring specifically now to FIG. 3, a more detailed schematic block diagram is provided of the chat server 240 introduced in relation to FIG. 2. As stated above, FIG. 3 is provided for background purposes and as an exemplary module for implementing a chat feature. The chat server 240 may be coupled to (e.g., in electronic communication with) a customer device 205 operated by the customer over a data communications network 210. The chat server 240 may be operated by a business or enterprise as part of a contact center 200 (e.g., FIG. 2) for implementing and orchestrating aspects of chat conversations with the customers of the business, including both automated chats and chats with human agents. In regard to automated chats, the chat server 240 may host one or more chat automation modules or chatbots 260A-260C (collectively referenced as 260), which are configured with computer program instructions for engaging in automated chat conversations. Thus, generally, the chat server 240 implements chat functionality, including the exchange of text-based or chat communications between a customer device 205 and an agent device 230 as well as between a customer device 205 and a chatbot 260. As will be discussed more below, the chat server 240 may include a customer interface module 265 and an agent interface module 266 for generating particular UIs at the customer device 205 and the agent device 230, respectively, that are included within the chat functionality.

The chatbots 260 may operate, for example, as an executable program that can be launched according to demand for the particular chatbot. According to an embodiment, the chat server 240 may operate as an execution engine or environment for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. According to an embodiment, the chat server 240 is configured to orchestrate the sharing of data among the various chatbots 260 as interactions are transferred or transitioned over from one chatbot to another or from one chatbot to a human agent. According to an embodiment, the data captured during interaction with a particular chatbot may be transferred along with a request to invoke a second chatbot or human agent.

In exemplary embodiments, the number of chatbots 260 may vary according to the design and function of the chat server 240 and is not limited to the number illustrated in FIG. 3. For example, different chatbots may be created to have different profiles. The profile of a particular chatbot may be used to select a chatbot with expertise for helping a customer on a particular subject control, for example, how the chatbot communicates with a particular customer. Engaging chatbots with profiles that are catered to specific types of customers may allow more effective communication with such customers. For example, one chatbot may be designed or specialized to engage in a first topic of communication (e.g., opening a new account with the business), while another chatbot may be designed or specialized to engage in a second topic of communication (e.g., technical support for a product or service provided by the business), that is different from the first topic of communication. In another example, the chatbots may be configured to utilize different dialects or slang or may have different personality traits or characteristics. For example, the vocabulary of the different chatbots may be tailored to use the slang or diction of young people, elder people, people in a certain region of the country, and/or people having a certain language or ethnic background. The chat server 240 may also host a default chatbot that may be invoked at a beginning of a chat conversation if there is insufficient information about the customer to invoke a more specialized chatbot. For example, if a customer intent is unknown when the conversation initially ensues, the default chatbot may be invoked to ask questions about the customer intent. According to an embodiment, a chatbot may be customer selectable, for example, based on accent, appearance, age group, language, etc., by way of a user interface. Additionally, a chatbot may be assigned to a customer based on demographic information of the customer. According to an embodiment, a chatbot profile may be selected based on information learned from publicly available information (e.g., social media information) about a customer.

According to an embodiment, a profile of a chatbot 260 may be stored in a profile database hosted in the storage device 220. The chatbot's profile data may include, without limitation, the chatbot's personality, gender, demographics, areas of expertise, and the like. According to an embodiment, for a given subject, including receptionist and concierge services, and specialists on particular products or services (e.g., travel booking, opening accounts, etc.), there may be several different chatbots 260, each with their own personality or profile.

Each of the different chatbots 260 may be configured, in conjunction with the chat server 240, to learn and evolve their behavior and responses according to input by the customers. For example, in response to customers reacting negatively to certain words, phrases, or responses, the chatbots 260 may learn to use different words, phrases, or responses. Such learning may be supervised in order to prevent undesired evolution of the personalities or profiles of the chatbots 260. For example, changes to the personalities or profiles of the chatbots 260 may be first approved or validated by human supervisors, certain keywords or phrases may be identified or flagged, and customer feedback may be analyzed. According to an embodiment, different chatbots 260 may be configured to learn from each other, in addition to learning based on customer feedback or agent feedback. For example, different chatbots 260 may be configured to communicate and exchange data with each other. In exemplary embodiments, the different chatbots 260 may operate as a neural network for deep learning and self-learning capabilities, by exchanging data with one another.

As mentioned, the chat server 240 may include a customer interface module 265 and an agent interface module 266. The customer interface module 265 may be configured to generating user interfaces (UIs) for display on the customer device 205 that facilitate chat communication between the customer and the chatbots 260 and the customer and human agents. The chat server 240 may include an agent interface module 266 for generating particular UIs on the agent device 230 that facilitate chat communication between an agent operating an agent device 230 and a customer operating a customer device 205. The agent interface module 266 may also generate UIs on the agent device 230 that allow an agent to monitor aspects of an ongoing chat between a chatbot 260 and a customer. The customer interface module 265 and the agent interface module 266, thus, may operate to facilitate the exchange of chat communications between the customer device 205 and one of the chatbots 260 and/or one of the agent devices 230. For example, the customer interface module 265 may transmit signals to the customer device 205 during a chat session that are configured to generated particular UIs on the customer device 205. As will be seen, those UIs generated on the customer device 205 may include the text messages sent from chatbots 260 or human agents as well as other non-text graphics that are intended to accompany the text messages, such as, emoticons or animations, for display therewith. Likewise, the agent interface module 266 may transmit signals to the agent device 230 during a chat session that are configured to generated particular UIs on the agent device 230. As will be seen, those UIs generated on the agent device 230 may include the text messages sent from customer device 205. The UIs generated on the agent device 230 also may include an interface that facilitates the selection of non-text graphics by the agent that are to accompany an outgoing text message to the customer.

According to an embodiment, the chat server 240 may be implemented in a layered architecture, with a media layer, a media control layer, and the chatbots executed by way of the IMR server 216 (similar to executing a VoiceXML on an IVR media server).

As depicted in FIG. 2, the chat server 240 may further be configured to interact with the knowledge management server 234 to query the server for knowledge information. The query, for example, may be based on a question received from the customer during a chat. Responses received from the knowledge management server 234 may then be provided to the customer as part of a chat response.

According to an embodiment, the chat server 240 may run on the same computer as the other servers of the contact center 200 depicted in FIG. 2. The chat server 240 may also run on a separate computer equipped with a processor, which executes program instructions and interacts with other system components to perform various methods and operations according to embodiments of the present invention. The chat server 240 may also run on the cloud or serverless architecture. The chat server 240 may include a memory, which operates as an addressable memory unit for storing software instructions to be executed by the processor. The memory may be implemented using any suitable memory device, such as a random access memory (RAM), and may additionally operate as a computer readable storage medium having non-transitory computer readable instructions stored therein that, when executed by the processor, cause the processor to control and manage an automated chat communication between the chat server 240, the customer device 205, and/or the agent device 230.

Referring specifically now to FIG. 4, a more detailed block diagram is provided of an exemplary chat automation module or chatbot 260. As stated, FIG. 4 is provided for background purposes and as an exemplary implementation of a chatbot. As would be understood by one of ordinary skill in the art, aspects of chatbot 260 may be used or modified for use with embodiments of the present invention. In the illustrated embodiment, the chatbot 260 includes a text analytics module 270, a dialog manager 272, and an output generator 274. The text analytics module is configured to analyze and understand natural language. In this regard, the text analytics module may be configured with a lexicon of the language, a syntactic/semantic parser, and grammar rules for breaking a phrase provided by the customer device 205, into an internal syntactic and semantic representation. According to an embodiment, the configuration of the text analytics module depends on the particular profile associated with the chatbot. For example, certain slang words may be included in the lexicon for one chatbot but excluded from another chatbot.

In operation, the dialog manager 272 receives the syntactic and semantic representation from the text analytics module 270 and manages the general flow of the conversation based on a set of decision rules. In this regard, the dialog manager 272 maintains history and state of the conversation, and generates an outbound communication based on the history and state. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script, and outputs the response to the output generator 274. According to an embodiment, the dialog manager 272 may also be configured to compute a confidence level for the selected response and provide the confidence level to the agent device 230. According to an embodiment, every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, assignment for a human agent to assist (e.g., by disambiguating input from the customer), and the like. The confidence level may be utilized to assist the system with deciding whether the detection, analysis, and response to the customer input is appropriate or sufficient, or whether a human agent should be involved. For example, a threshold confidence level may be assigned to invoke human agent intervention, based on one or more business rules. According to an embodiment, confidence level may be determined based on customer feedback. For example, in response to detecting a negative reaction from a customer to an action or response taken by the chatbot, the confidence level may be reduced. Conversely, in response to detecting a positive reaction from a customer, the confidence level may be increased.

According to an embodiment, the response selected by the dialog manager 272 may include information provided by the knowledge management server 234. The information may be, for example, a link to a knowledge article that the chatbot may want to recommend to the customer in response to a question posed by the customer.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an outbound text to be displayed at the customer device 205. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Brief reference will now be made to FIG. 5, in which a webpage 280 having an exemplary implementation of a chat feature 282 is presented. The webpage 280, for example, may be associated with a business or enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones, to name a few non-limiting examples. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. As will be appreciated, the chat feature 282 may include an exemplary way for customers to enter text messages for delivery to a contact center associated with a particular organization or enterprise.

As an example, the webpage 280 may be accessed by a customer via a customer device, which provides a communication channel for interacting or chatting with bots or live agents. In exemplary embodiments, as shown, the chat feature 282 includes an interface generated on a screen of the customer device, such as customer device 205. This user interface of the chat feature 282 may be referred to herein as a customer chat interface 284. The customer chat interface 284, for example, may be generated by a customer interface module of a chat server, as already described. The customer interface module may send signals to the customer device that are configured to generate a desired customer chat interface 284 in accordance with the content of a chat message issued by a chat source, which as depicted is a chatbot named "Kate". The customer chat interface 284 may be contained within a designated area or window, with that window covering a designated portion of the webpage 280. The customer chat interface 284 also may be a text display area 286, which is the area dedicated to the display of received and sent text messages. and a text input area 288, which facilitates the customer's input of text messages. Though this may be achieved in other ways, the chat interface of FIG. 5 illustrates one manner by which text messages may be entered by customers for communicating with an agent or chatbot of a contact center.

Before proceeding further with the description of the present invention, an explanatory note will be provided in regard to referencing system components—e.g., modules, servers, and other components—that have already been introduced in the previous figures. Whether or not a subsequent reference includes the corresponding numerical identifiers of FIGS. 1-5, it should be understood that the reference incorporates the previously discussed examples and, unless otherwise specifically limited, may be implemented in accordance with those examples and/or using other conventional technology capable of fulfilling the desired functionality, as would be understood by one of ordinary skill in the art. Thus, for example, subsequent mention of a "contact center" should be understood as referring to the exemplary "contact center 200" of FIG. 2 and/or other conventional technology for implementing a contact center. As additional examples, a subsequent mention below to a "customer device", "agent device", "chat server", "computing device", "chatbot", or "customer interface module" should be understood as referring to the exemplary "customer device 205", "agent device 230", "chat server 240", "computing device 200", "chatbot 260", or "customer interface module 265", respectively, of FIGS. 1-5, as well as conventional technology for fulfilling the same functionality.

Customer Automation Systems

Turning now to FIGS. 6 through 11, embodiments of the present invention include systems and methods for automating and augmenting customer actions during various stages of interaction with a customer service provider or contact center. As used herein, the various stages of such interactions may be classified as including pre-contact, during-contact, and post-contact stages (or pre-interaction, during-interaction, and post-interaction stages).

Figure 6:
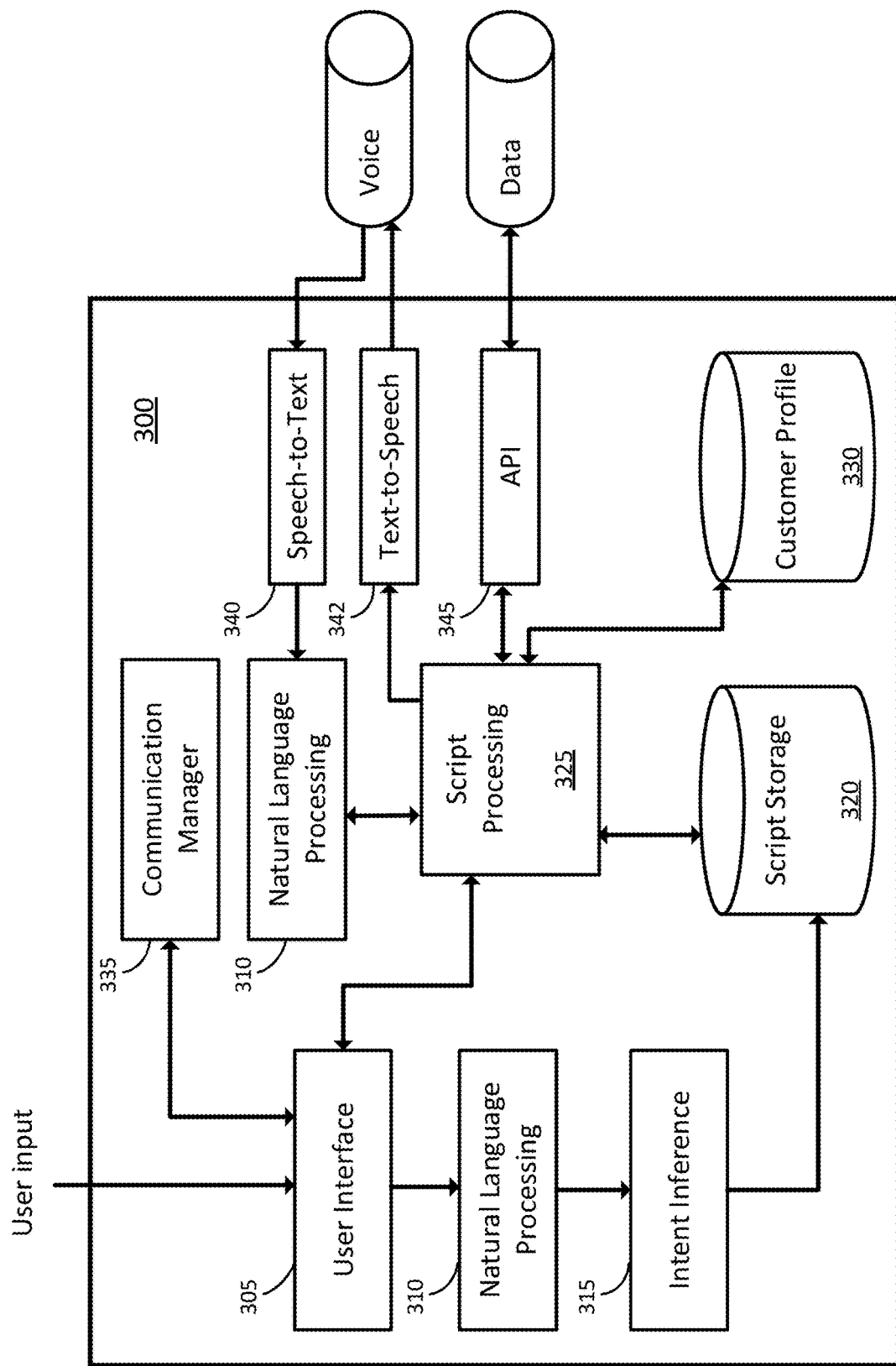
FIG. 6 is a block diagram of a customer automation system according to embodiments of the present invention.

With specifically reference now to FIG. 6, an exemplary customer automation system 300 is shown which may be used in methods and systems of the present invention. To better explain how the customer automation system 300 functions, reference will also be made to FIG. 7, which shows a flowchart 350 of an exemplary method for automating customer actions when interacting with contact centers. Additional information related to customer automation and related systems and methods are provided in U.S. application Ser. No. 16/151,362, filed on Oct. 4, 2018, entitled "System and Method for Customer Experience Automation", the content of which is incorporated herein by reference. As will be seen, the customer automation system 300 may be used as part of an automated personal assistant (or "personal bot") 405, which is introduced in the discussion related to FIG. 8.

The customer automation system 300 of FIG. 6 represents a system that may be generally used for customer-side automations, which, as used herein, refers to the automation of actions on behalf of a customer in interactions with customer service providers or contact centers Such interactions may also be referred to as "customer-contact center interactions" or simply "customer interactions". Further, in discussing such customer-contact center interactions, it should be appreciated that reference to a "contact center" or "customer service provider" is intended to generally refer to any customer service department or other service provider associated with an organization or enterprise (such as, for example, a business, governmental agency, non-profit, school, etc.) with which a user or customer has business, transactions, affairs or other interests.

In exemplary embodiments, the customer automation system 300 may be implemented as a software program or application running on a mobile device or other computing device, cloud computing devices (e.g., computer servers connected to the customer device 205 over a network), or combinations thereof (e.g., some modules of the system are implemented in the local application while other modules are implemented in the cloud. For the sake of convenience, embodiments of the present invention may be primarily described in the context of implementation via an application running on the customer device 205. However, it should be understood that present embodiments are not limited thereto.

The customer automation system 300 may include several components or modules. For example, as shown, the customer automation system 300 may include a user interface 305, a natural language processing (NLP) module 310, an intent inference module 315, a script storage module 320, a script processing module 325, a customer profile module 330, a communication manager module 335, a text-to-speech module 340a, a speech-to-text module 340b, and an application programming interface (API) 345, each of which will be described with more particularity with reference also to flowchart 350 of FIG. 7. It will be appreciated that some of the components of and functionalities associated with the customer automations system 300 may overlap with the chatbot systems described above in relation to FIGS. 3, 4, and 5. In cases where the customer automation system 300 and such chatbot systems are employed together as part of a customer-side implementation—such as in the example of the personal bot 405 of FIG. 8—it is anticipated that such overlap may include the sharing of resources between the two systems.

Figure 7:
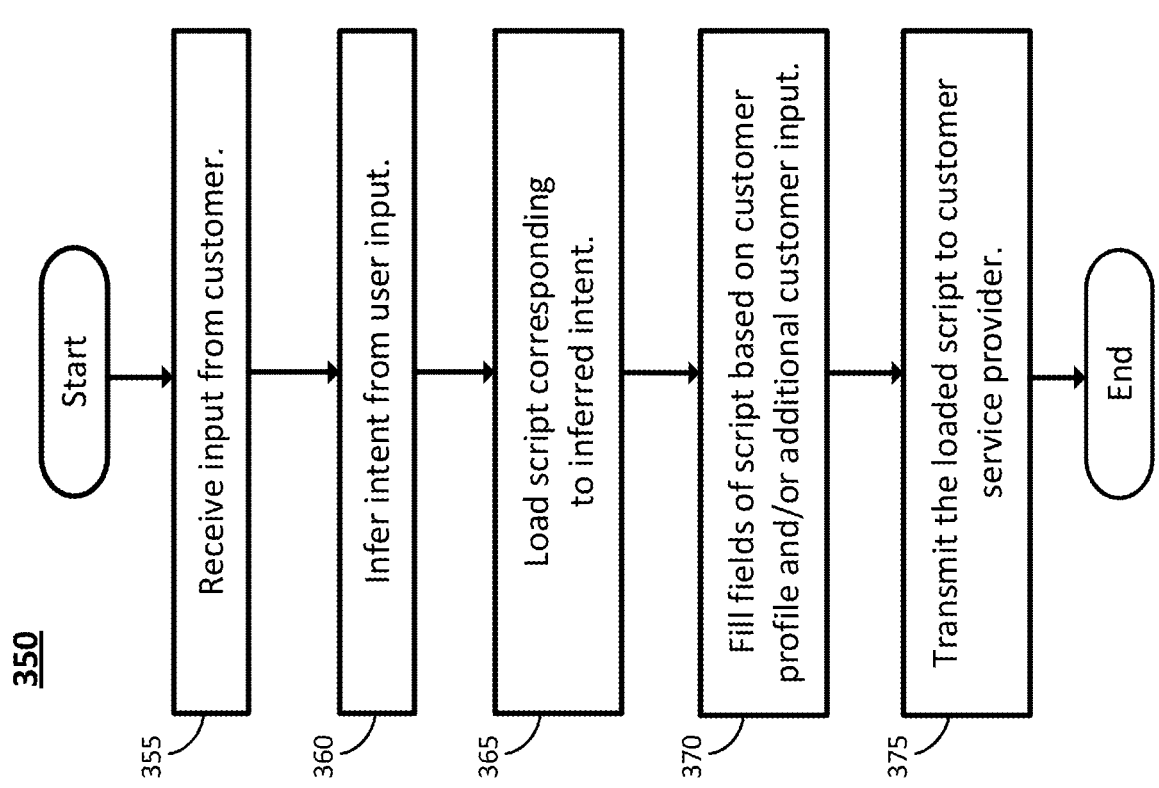
FIG. 7 is a flowchart of a method for automating an interaction on behalf of a customer according to embodiments of the present invention.

In an example of operation, with specific reference now to the flowchart 350 of FIG. 7, the customer automation system 300 receives input at an initial step or operation 355. Such input may come from several sources. For example, a primary source of input may be the customer, where such input is received via the user interface 305 on the customer device (e.g., customer device 205). The input also may include data received from other parties, particularly parties interacting with the customer through the customer device. For example, information or communications sent to the customer from the contact center may provide aspects of the input. In either case, the input may be provided in the form of free speech or text (e.g., unstructured, natural language input). Input also may include other forms of data received or stored on the customer device.

Continuing with the flow diagram 350, at an operation 360, the customer automation system 300 parses the natural language of the input using the NLP module 310 and, therefrom, infers a customer intent using the intent inference module 315. That is, the customer's intent is determined given the input. For example, where the customer input is provided as speech, the speech may be transcribed into text by a speech-to-text system (such as a large vocabulary continuous speech recognition or LVCSR system) as part of the parsing by the NLP module 310. The transcription may be performed locally on the customer device 205 or the speech may be transmitted over a network for conversion to text by a cloud-based server. In certain embodiments, for example, the intent inference module 315 may automatically infer the customer's intent from the text of the customer input using artificial intelligence or machine learning techniques. These artificial intelligence techniques may include, for example, identifying one or more keywords from the customer input and searching a database of potential intents corresponding to the given keywords. The database of potential intents and the keywords corresponding to the intents may be automatically mined from a collection of historical interaction recordings. In cases where the customer automation system 300 fails to understand or completely understand the intent from the customer's input, a selection of several intents may be provided to the customer in the user interface 305. The customer may then clarify his/her intent by selecting one of the alternatives or may request that other alternatives be provided.

After the customer's intent is determined, the flowchart 350 proceeds to an operation 365 where the customer automation system 300 loads a script associated with the given intent. Such scripts, for example, may be stored and retrieved from the script storage module 320. As will be appreciated, the script may include a set of commands or operations, pre-written speech or text, and/or fields of parameters or data (also "data fields"), which represent data that is expected to be required in automating an action for the customer. For example, the script may include commands, text, and data fields that will be required to complete an interaction with a contact center in order to resolve the issue specified by the customer's intent. Scripts may be specific to a particular contact center (or a particular organization) and, in exemplary embodiments, may be further tailored to resolving a particular issue. Scripts may be organized in a number of ways. In exemplary embodiments, the scripts are organized in a hierarchical fashion, such as where all scripts pertaining to a particular organization are derived from a common "parent" script that defines common features. An example of common features might be common templates for authentication steps (e.g., account numbers and verification codes), where "child" scripts include templates for the different types of issues to be resolved (e.g., double billing, requests for reductions in price, service pausing, service plan modification, service cancellation, and the like). In exemplary embodiments, rather than a hierarchical relationship, the scripts are assembled from common tasks, such as combining "authentication" templates for authenticating with various service providers and "issue" templates for resolving common issues that may be associated with multiple providers.

The scripts may be produced via mining data, actions, and dialogue from previous customer interactions. Specifically, the sequences of statements made during a request for resolution of a particular issue may be automatically mined from a collection of historical interactions between customers and customer service providers. Systems and methods may be employed for automatically mining effective sequences of statements and comments, as described from the contact center agent side, are described in U.S. patent application Ser. No. 14/153,049 "Computing Suggested Actions in Caller Agent Phone Calls By Using Real-Time Speech Analytics and Real-Time Desktop Analytics," filed in the United States Patent and Trademark Office on Jan. 12, 2014, the entire disclosure of which is incorporated by reference herein.

With the script retrieved, the flowchart 350 proceeds to an operation 370 where the customer automation system 300 processes or "loads" the script. This action may be performed by the script processing module 325, which performs it by filling in the data fields of the script with appropriate data pertaining to the customer. More specifically, the script processing module 325 may extract customer data that is relevant to the anticipated interaction, with that relevance being predetermined by the script selected as corresponding to the customer's intent. According to preferred embodiments, the data for some or most of the data fields within the script may be automatically loaded with data retrieved from customer data stored within the customer profile module 330. As will be appreciated, the customer profile module 330 may store particular data related to the customer, for example, the customer's name, birth date, address, account numbers, authentication information, and other types of information relevant to customer service interactions. The data selected for storage within the customer profile module 330 may be based on data the customer has used in previous interactions and/or include data values obtained directly by the customer. In case of any ambiguity regarding the data fields or missing information within a script, the script processing module 325 may include functionality that prompts and allows the customer to manually input the needed information.

Referring again to the flowchart 350, at an operation 375, the loaded script may be transmitted to the customer service provider or contact center. As discussed more below, the loaded script may include commands and customer data necessary to automate at least a part of an interaction with the contact center on the customer's behalf. In exemplary embodiments, the API 345 is used so to interact with the contact center directly. Contact center may define a protocol for making commonplace requests to their systems, which is provided for in the API 345. Such APIs may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, the customer automation system 300 may automatically generate a formatted message in accordance with a defined protocol for communication with a contact center, where the message contains the information specified by the script in appropriate portions of the formatted message.

Personal Bot

Figure 8:
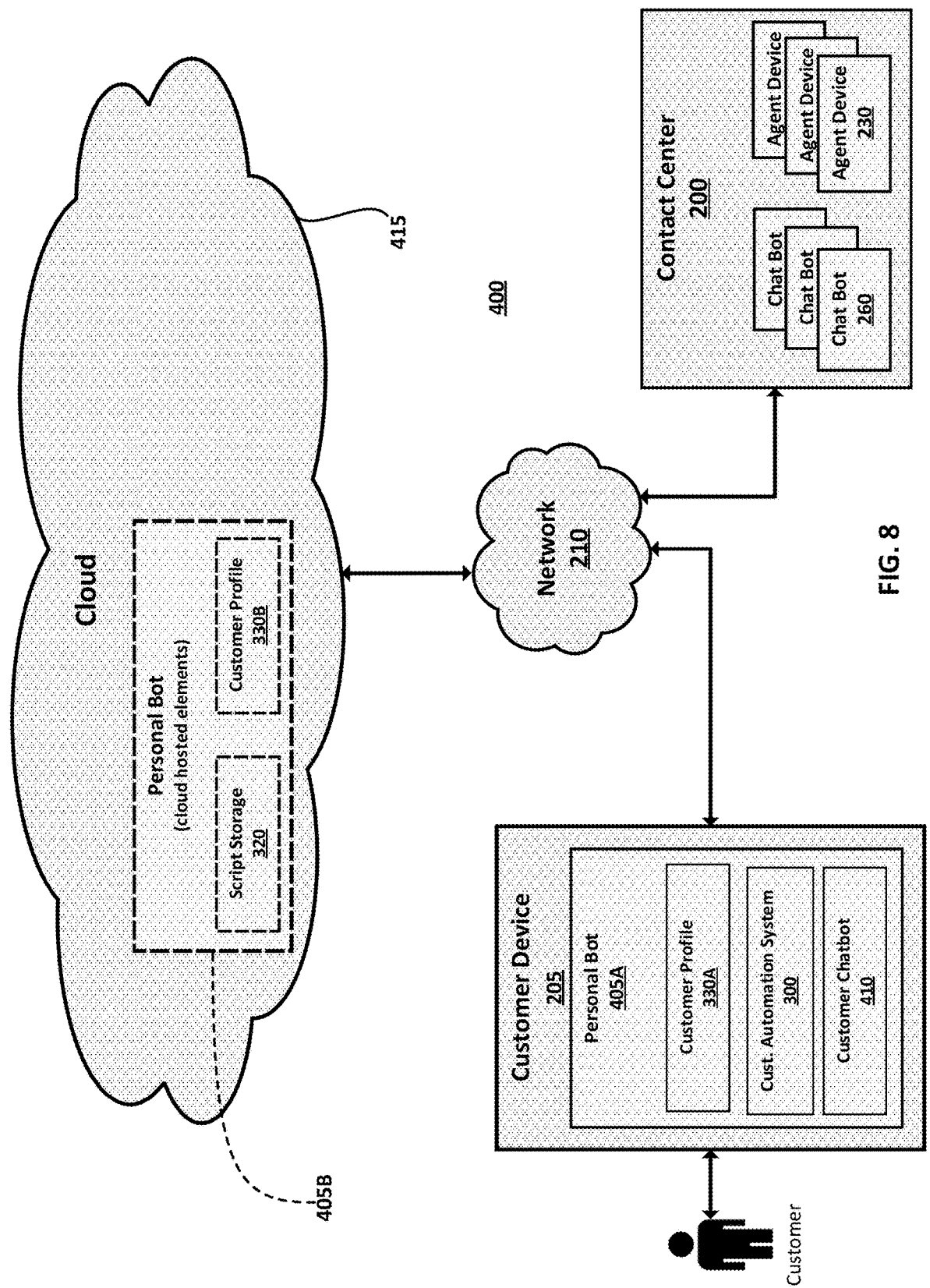
FIG. 8 is a block diagram of an automated personal bot for a customer according to embodiments of the present invention.

With reference now to FIG. 8, an exemplary embodiment is provided of an automated personal assistant or, as referenced herein, personal bot 405. As will be seen, the personal bot 405 is configured to automate aspects of interactions with a customer service provider on behalf of a customer. As stated above, present invention relates to systems and methods for automating aspects of the customer-side of the interactions between customers and customer service providers or contact centers. Accordingly, the personal bot 405 may provide ways to automate actions that customers are required to perform when contacting, interacting, or following up with contact centers.

The personal bot 405, as used herein, may generally reference any customer-side implementation of any of the automated processes or automation functionality described herein. Thus, it should be understood that, unless otherwise specifically limited, the personal bot 405 may generally employ any of the technologies discussed herein—including those related to the chatbots 260 and the customer automation system 300—to enable or enhance automation services available to customers. For example, as indicated in FIG. 8, the personal bot 405 may include the functionality of the above-described customer automation system 300. Additionally, the personal bot 405 may include a customer-side implementation of a chatbot (for example, the chatbot 260 of FIGS. 4 and 5), which will be referred herein as a customer chatbot 410. As will be seen, the customer chatbot 410 may be configured to interact privately with the customer in order to obtain feedback and direction from the customer pertaining to actions related to ongoing, future, or past interactions with contact centers. Further, the customer chatbot 410 may be configured to interact with live agents or chatbots associated with a contact center on behalf of the customer.

As shown in FIG. 8, in regard to system architecture, the personal bot 405 may be implemented as a software program or application running on a mobile device or personal computing device (shown as a customer device 205) of the customer (see "405A"). The personal bot 405 also may include remote or cloud computing components (e.g., one or more computer servers connected to the customer device 205 over a network 210), which may be hosted in a cloud computing environment (or simply a "cloud") 415 (see "405B"). For example, as shown in the illustrated example, elements of the script storage module 320 and the customer profile module 330 may be stored in databases in the cloud 415. It should be understood, however, that present embodiments are not limited to this arrangement and, for example, may include other components being implemented in the cloud 415.

Accordingly, as will be seen, embodiments of the present invention include systems and methods for automatically initiating and conducting an interaction with a contact center to resolve an issue on behalf of a customer. Toward this objective, the personal bot 405 may be configured to automate particular aspects of interactions with a contact center on behalf of the customer. Several examples of these types of embodiments will now be discussed in which resources described herein—including the customer automation system 300 and customer chatbot 410—are used to provide the necessary automation. In presenting these embodiments, reference is again made to previously incorporated U.S. application Ser. No. 16/151,362, entitled "System and Method for Customer Experience Automation", which includes further background and other supporting materials.

Pre-Interaction Automation

Embodiments of the present invention include the personal bot 405 and related resources automating one or more actions or processes by which the customer initiates a communication with a contact center for interacting therewith. As will be seen, this type of automation is primarily aimed at those actions normally occurring within the pre-contact or pre-interaction stage of customer interactions.

For example, in accordance with an exemplary embodiment, when a customer chooses to contact a contact center, the customer automation system 300 may automate the process of connecting the customer with the contact center. For example, present embodiments may automatically navigate an IVR system of a contact center on behalf of the customer using a loaded script. Further, the customer automation system 300 may automatically navigate an IVR menu system for a customer, including, for example, authenticating the customer by providing authentication information (e.g., entering a customer number through dual-tone multi-frequency or DTMF or "touch tone" signaling or through text to speech synthesis) and selecting menu options (e.g., using DTMF signaling or through text to speech synthesis) to reach the proper department associated with the inferred intent from the customer's input. More specifically, the customer profile module 330 may include authentication information that would typically be requested of customers accessing customer support systems such as usernames, account identifying information, personal identification information (e.g., a social security number), and/or answers to security questions. As additional examples, the customer automation system 300 may have access to text messages and/or email messages sent to the customer's account on the customer device 205 in order to access one-time passwords sent to the customer, and/or may have access to a one-time password (OTP) generator stored locally on the customer device 205. Accordingly, embodiments of the present invention may be capable of automatically authenticating the customer with the contact center prior to an interaction.

In addition, the customer automation system 300 may facilitate a customer contacting a contact center via multiple channels for communication, such as, call (e.g., voice and/or video), chat, or e-mail. In exemplary embodiments, the communication channels may include calling, chatting, and leaving a message. Estimated wait times for interactions with a live agent (e.g., call or chat) may also be shown to the customer. For example, if the customer chooses to call and speak with a live agent, the customer may be offered several options. These options might include to wait (e.g., "dial now and wait"), select a callback (e.g., "dial now and skip waiting"), or schedule a call for a given time (e.g., "schedule a callback"). In exemplary embodiments, if the customer selects to schedule a call for a given time by opting for "schedule a callback," for example, the customer automation system 300 may access the customer's calendar (stored/accessible on the same customer device 205) and offer suggestions for free times in the customer's calendar. The customer automation system 300 may determine that the customer is free at particular times over the next two days. These times may be automatically presented to the customer for selection thereby. The customer may also choose to schedule the call at another time and input this into the user interface 305. Certain embodiments of the present invention may enable callback scheduling even when contact centers do not directly support such a feature. For example, assuming that the customer has scheduled a callback for 10:00 am, the system may automatically determine the approximate wait time during the time periods leading up to 10:00 am. This might be based on historical data captured from other customers contacting this particular organization or it may be based on wait time data published by the contact center. Thus, in accordance with exemplary embodiments, the customer automation system 300 automatically connects to the contact center at a time prior to the scheduled call back time, based on the expected wait time, and supplies the set of information provided to the customer automation system 300 in accordance with the script in order to be placed on hold by the contact center. For example, the customer automation system 300 may automatically determine that the expected wait time at 09:15 is 45 minutes, and therefore initiates communication with the contact center at 09:15 in order have an agent available to speak to the customer at around 10:00. When the customer automation system 300 is connected to a live contact center agent (e.g., by detecting a ringing on the contact center end of the communication channel or by detecting a voice saying "hello"), an automatic notification may be sent to the customer (e.g., by ringing at the customer device 205) and then the customer may be connected to the live agent.

In accordance with other embodiments, the customer automation system 300 may automate a process for preparing an agent before a call from a customer. For example, the customer automation system 300 may send a request that the agent study certain materials provided by the customer before the live call happens.

During-Interaction Automation

Embodiments of the present invention further include the personal bot 405 and related resources automating the actual interaction (or aspects thereof) between the customer and a contact center. As will be seen, this type of automation is primarily aimed at those actions normally occurring within the during-contact or during-interaction stage of customer interactions.

For example, the customer automation system 300 may interact with entities within a contact center on behalf of the customer. Without limitation, such entities may include automated processes, such as chatbots, and live agents. Once connected to the contact center, the customer automation system 300 may retrieve a script from the script storage module 320 that includes an interaction script (e.g., a dialogue tree). The interaction script may generally consist of a template of statements for the customer automation system 300 to make to an entity within the contact center, for example, a live agent. In exemplary embodiments, the customer chatbot 410 may interact with the live agent on the customer's behalf in accordance with the interaction script.

As already described, the interaction script (or simply "script") may consist of a template having defined dialogue (i.e., predetermined text or statements) and data fields. As previously described, to "load" the script, information or data pertinent to the customer is determined and loaded into the appropriate data fields. Such pertinent data may be retrieved from the customer profile module 330 and/or derived from input provided by the customer through the customer interface 305. According to certain embodiments, the customer chatbot 410 also may be used to interact with the customer to prompt such input so that all of the necessary data fields within the script are filled. In other embodiments, the script processing module 325 may prompt the customer to supply any missing information (e.g., information that is not available from the customer profile module 330) to fill in blanks in the template through the user interface 305 prior to initiating a communication with the contact center. In certain embodiments, the script processing module 325 may also request that the customer confirm the accuracy of all of the information that the customer automation system 300 will provide to the contact center.

Once the loaded script is complete, for example, the interaction with the live agent may begin with an initial statement explaining the reason for the call (e.g., "I am calling on behalf of your customer, Mr. Thomas Anderson, regarding what appears to be double billing."), descriptions of particular details related to the issue (e.g., "In the previous three months, his bill was approximately fifty dollars. However, his most recent bill was for one hundred dollars."), and the like. While such statements may be provided in text to the contact center, it may also be provided in voice, for example, when interacting with a live agent. In regard to how such an embodiment may function, a speech synthesizer or text-to-speech module 340a may be used to generate speech to be transmitted to the contact center agent over a voice communication channel. Further, speech received from the agent of the contact center may be converted to text by a speech-to-text converter 340b, and the resulting text then may be processed by the customer automation system 300 or customer chatbot 410 so that an appropriate response in the dialogue tree may be found. If the agent's response cannot be processed by the dialogue tree, the customer automation system 300 may ask the agent to rephrase the response or may connect the customer to the agent in order to complete the transaction.

While the customer automation system 300 is conducting the interaction with the live agent in accordance with the interaction script, the agent may indicate his or her readiness or desire to speak to the customer. For the agent, readiness might occur after reviewing all of the media documents provided to the agent by the customer automation system 300 and/or after reviewing the customer's records. In exemplary embodiments, the script processing module 325 may detect a phrase spoken by the agent to trigger the connection of the customer to the agent via the communication channel (e.g., by ringing the customer device 205 of the customer). Such triggering phrases may be converted to text by the speech-to-text converter 340b and the natural language processing module 310 then may determine the meaning of the converted text (e.g., identifying keywords and/or matching the phrase to a particular cluster of phrases corresponding to a particular concept).

As another example, the customer automation system 300 may present automatically generated "quick actions" to the customer based on the customer's inferred intent and other data associated with the ongoing interaction. In some circumstances, the "quick actions" require no further input from the customer. For example, the customer automation system 300 may suggest sending an automatically generated text or email message to the contact center directly from a main menu screen, where the message describes the customer's issue. The message may be generated automatically by the script processing module based on a message template provided by the script, where portions of the template that contain customer-specific and incident-specific data are automatically filled in based on data collected about the customer (e.g., from the customer profile) and that the customer has supplied (e.g., as part of the initial customer input). For example, in the case where the customer input references a question about a possible double billing by a particular service provider, the script processing module 325 can reference previous billing statements, which may be stored as part of the customer profile module 330, to look for historical charges. The customer automation system 300 infers from these previous billing statements that the amount charged for the period in question was unusually high. In such cases, the system may automatically generate a message which may contain the information about the customer's typical bills and the problem with the current bill. The customer can direct the customer automation system 300 to send the automatically generated message directly to the contact center associated with the service provider. In exemplary embodiments, the script may provide multiple templates, and the customer may select from among the templates and/or edit a message prior to sending, in order to match the customer's personality or preferred tone of voice.

In other exemplary embodiments, the personal bot 405 may automate processes that augment a current or ongoing interaction between the customer and a contact center (e.g., between the customer and either a chatbot or a live agent of the contact center). While the personal bot 405 may not handle the interaction in such embodiments, the personal bot may work behind the scenes to facilitate the customer's interaction with a contact center, so to increase the likelihood of a desirable outcome for the customer. In such embodiments, once the interaction has been initiated with a live agent, meta-data regarding the interaction may be displayed to the customer in the user interface 305. This may be done throughout the interaction, with the information being update based on the progression of the ongoing interaction. Examples of such information might include, but not be limited to, name of the contact center, name of the department reached, reason for the call, name of the contact center agent, name of other agents who were on the call, etc. According to exemplary embodiments, this type of information may include a transcript of the ongoing call so that the customer can easily look back at previous statements. In addition, the customer automation system 300 may display other types of information to the customer that is found pertinent given, for example, the recognition of certain key words within the transcript of the ongoing conversation. That is, the customer automation system 300 may push relevant content from a knowledge base (e.g., the knowledge system 238 of FIG. 2) to the customer given the content of the transcript of the interaction.

The customer automation system 300 also may enable the customer and agent to share relevant content with each other throughout the interaction. For example, in one embodiment, the agent or customer may share screens, documents (contracts, warranties, etc.), photos, and other files with each other. Other files may also be shared, such as screenshots of content captured by one of the parties during the conversation, a current view from a camera, links, photographs of broken or failed products, screenshots of error messages, copies of documents, proofs of purchase, or any other supporting file. The customer automation system 300, thus, may provide functionality that facilitates the customer supplying or sharing additional or augmenting material to an agent of the contact center that is relevant to an ongoing interaction. To do this, for example, a supplemental communication channels (e.g., a data channel) is established in parallel to the primary communication channel (e.g., a voice communication channel or a text communication channel) to transfer the augmenting information between the customer and the contact center agent. In certain embodiments, these documents may be provided along with an automatically generated "quick actions" message. For example, such quick action messages may prompt the customer to take a photo of the broken part, for inclusion in the shared material.

In accordance with other embodiments, the communication manager 335 monitors conditions for a customer based on specified intents and automatically generates notifications to be presented to the customer through the user interface 305. For example, based the previous activity of the customer (for example, the customer's billing statements, which may be stored in the customer profile module 330, and communications from different contact centers), the communication manager 335 may automatically generate notifications which might be of interest to the customer. Examples of a notification generated by the communication manager may include a reminder about the upcoming expiration of a deal, an offer of a new deal, actions for the customer, and the like. For example, the notification may offer quick actions that can be performed directly from the notification screen, such as how to get a specific deal, call a contact center about a specific deal, search for more deals, cancel a service, etc. The communication manager 335 may customize notifications to the customer based on the customer's previous deals, billing statements, crowdsourced information about how similar customers reacted to deals, personal preferences, and the like. The communication manager 335 may provide such functionality through the user interface 305 for the customer to search for more deals based on their needs. Should the customer select this option, the customer automation system 300 may present some relevant deals that are identified from a database of deals.

In accordance with other embodiments, the customer automation system 300 may provide 'end of deal' notifications. In such cases, the customer is informed about the ending of deal, contract, business arrangement, or the like. For example, a customer may be notified about the ending of an internet package deal with their current internet service provider (ISP). The customer may be presented with the best deals offered by their current ISP and the best deals offered by other ISPs. Continuing with this example, the customer automation system 300 may offer specific deals without requiring communication with the contact center, such as a call-in to the relevant customer service department. Pricing may also be shown along with other comparisons relevant to the customer. For example, promotional offers may be compared to the average usage of the customer (e.g., based on the customer profile) and current pricing of their plan. Other suggested options that are specific to the customer intent in the notification may also be presented, such as a "cancel service" option and an option to "search more deals." Should the customer select the "cancel service" option, the customer automation system 300 may send a cancellation request to the contact center automatically. The customer automation system 300 may also search for more deals which fit the customer's needs and present these whether the customer has selected to cancel their service or just search for additional deals. These may also be presented to the customer.

According to other embodiments, the customer automation system 300 may monitor statements made by the contact center agent and automatically offers guidance to the customer in real-time. For example, the customer automation system 300 converts the contact center agent's speech to text using the speech-to-text converter 340*b* and processes the text using the natural language processing module 310. In exemplary embodiments, the natural language processing module 310 detects when the agent is making an offer and compares it to a database of other offers made by agents of the organization that the customer is speaking with. This database of other offers is crowdsourced from other customers. After identifying a corresponding matching offer in the database, the ranking of the offer compared to other offers is identified in order to determine whether the agent could make a better offer.

According to still other embodiments, the customer automation system 300 may present information to the customer about prior interactions with a particular contact center or organization. For example, such information may be retrieved during an ongoing interaction to show the current agent what other agents have said.

Customer Privacy Automation

Embodiments of the present invention further include the personal bot 405 and related resources functioning to automate aspects related to privacy for a customer. More particularly, the customer automation system 300 of the personal bot 405 may allow customers to manage privacy or data sharing with organizations and corresponding contact centers.

In accordance with exemplary embodiments, for example, the customer automation system 300 may facilitate the customer managing settings for privacy and data sharing (or simply "data sharing settings") globally, for example, across all providers and data types. The customer is enabled to manage data sharing settings on a per-organization basis by choosing which data type to share with each specific organization. As another example, the customer is enabled to manage data (e.g., data within a customer profile) according to data type. In such cases, the customer may choose which organization or which types of organizations to share each particular data type. In more detail, each field of data in the customer profile may be associated with at least one permission setting (e.g., in exemplary embodiments, each field of data may have a different permission setting for each provider). Further, user interfaces may be provided through the customer device 205 that allow the customer to adjusting data sharing settings and/or permission settings. Within such user interfaces, data sharing settings or permission settings may be made adjustable on a per data type, per organization basis, per type of organization basis, etc.

In accordance with exemplary embodiments, the customer automation system 300 may offer a plurality of levels for data sharing settings or permission settings. For example, in one embodiment, three different levels of permission settings are offered: share data, share anonymous data, and do not share any data. Anonymous data may include, for example, genericized information about the customer such as gender, zip code of residence, salary band, etc. Some aspects of embodiments of the present invention may enable compliance with the General Data Protection Regulation (GDPR) of the European Union (EU). In other embodiments, the customer automation system 300 provides functionality for a customer to exercise the "right to be forgotten" with all organizations (e.g., providers and/or business) that the customer has interacted with. In other embodiments, the customer can switch on/off the sharing of each of the data types. When selecting a specific data type, the customer can select to send this data in an anonymized form to the provider or to delete the previously shared data with a particular organization. Additionally, the customer can delete all data types that were previously shared with an organization, for example, by clicking on the 'trash' button provided in the customer interface. According to one embodiment of the present invention, the deletion of the data may include the customer automation system 300 loading an appropriate script from the script storage module 320 in order to generate a formal request to the associated organization to delete the specified data. As noted above, for example, the customer automation system 300 may be used to make such request by initiating a communication with a live agent of the organization or by accessing an application programming interface provided by the organization.

Post-Interaction Automation

Embodiments of the present invention include methods and systems for identifying outstanding matters or pending actions for a customer that need additional attention or follow-up, where those pending actions were raised during an interaction between the customer and a contact center. Once identified, other embodiments of the present invention include methods and systems for automating follow-up actions on behalf of the customer for moving such pending actions toward a resolution. For example, via the automation resources disclosed herein, the personal bot 405 may automate subsequent or follow-up actions on behalf of a customer, where those follow-up actions relate to actions pending from a previous interaction with a customer service provider. As will be appreciated, this type of automation is primarily aimed at those actions normally occurring within the post-contact or post-interaction stage of a customer interaction, however it also includes the automation of action that also can be characterized as preceding or prompting a subsequent customer interaction.

Figure 9:
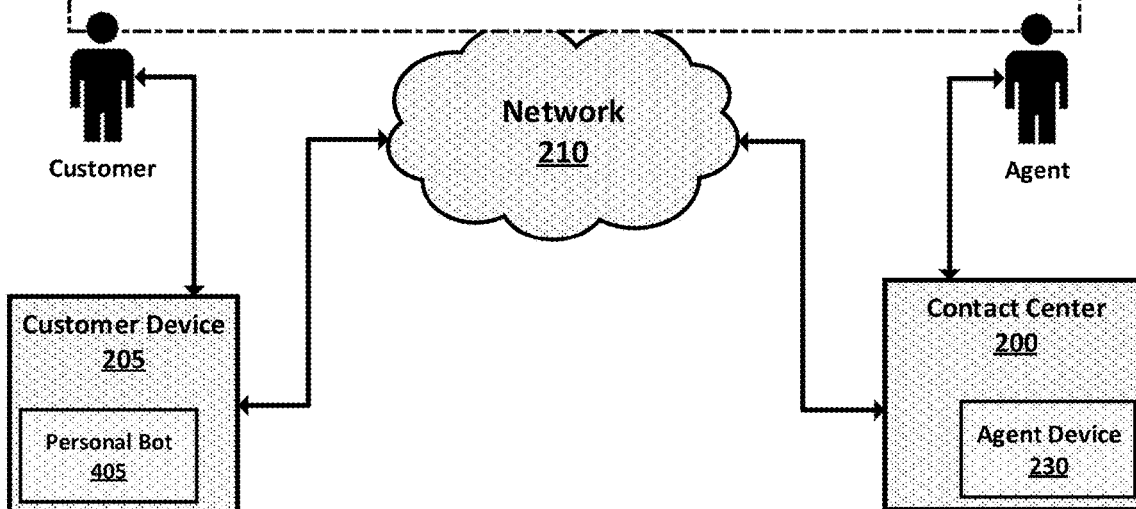
FIG. 9 is an example as to how a customer interaction is processed according to embodiments of the present invention.
Figure 10:
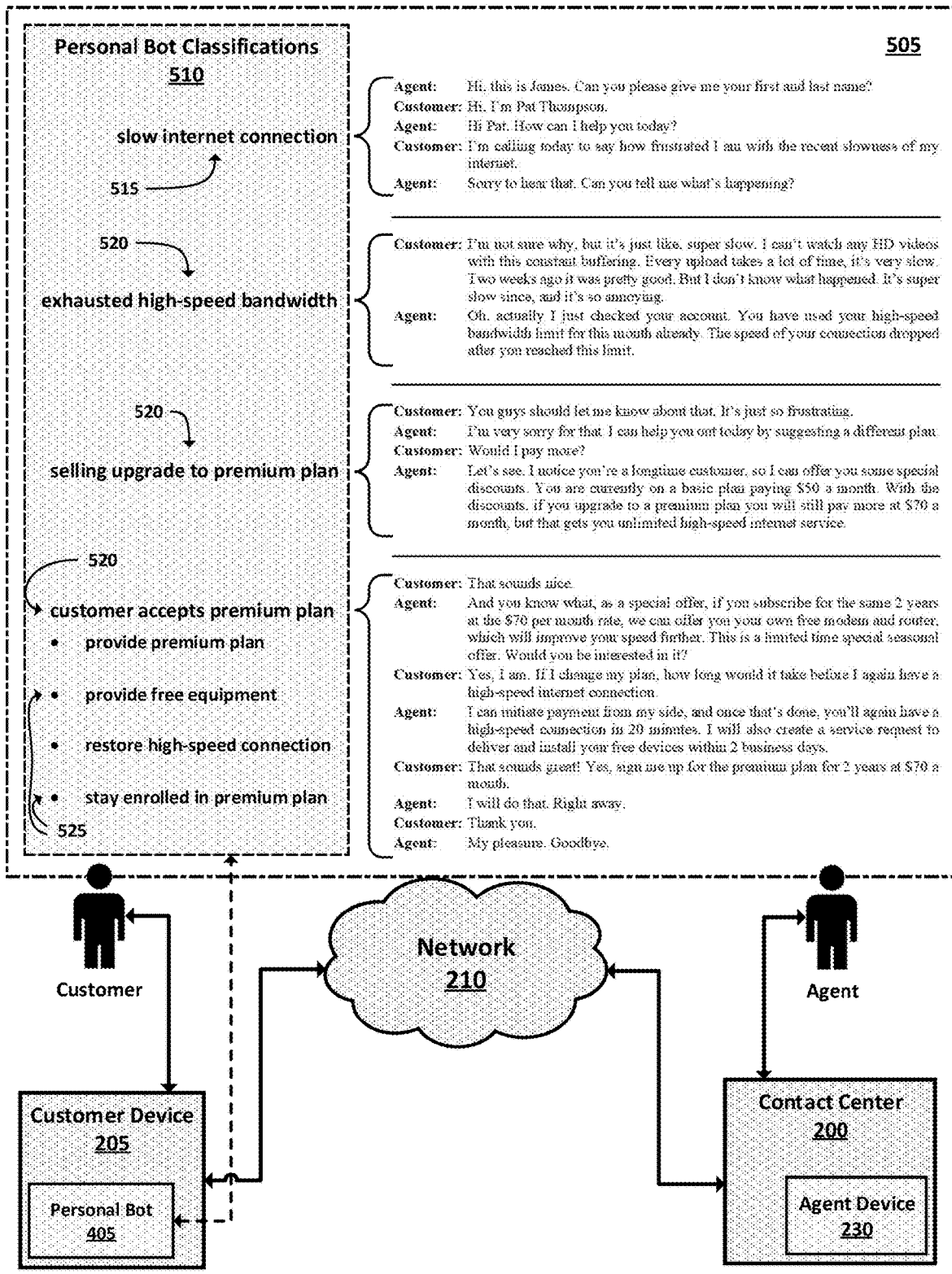
FIG. 10 is an example as to how a customer interaction is processed according to embodiments of the present invention.
Figure 11:
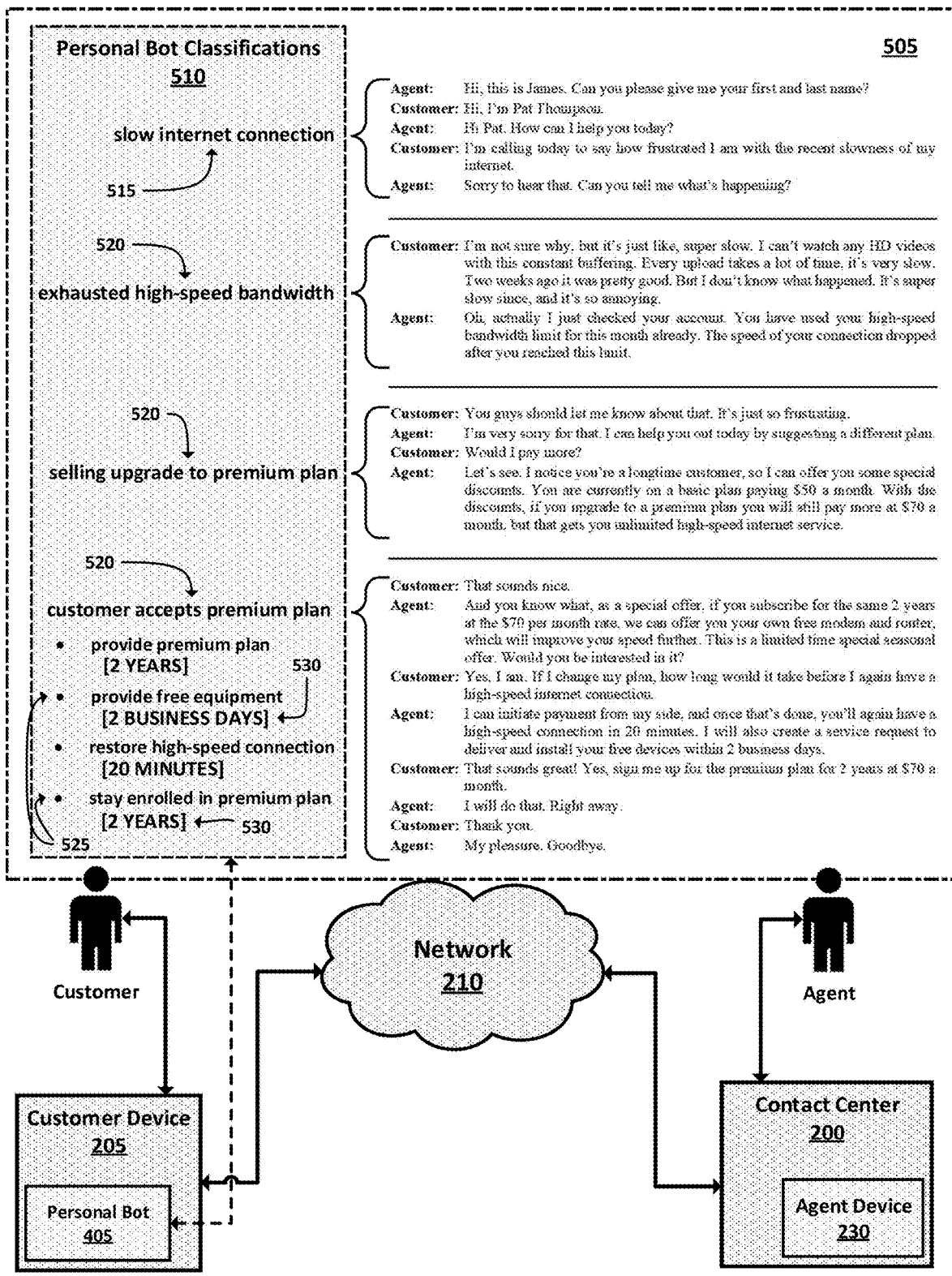
FIG. 11 is an example as to how a customer interaction is processed according to embodiments of the present invention.

With reference to FIGS. 9, 10 and 11, an exemplary interaction is illustrated of a conversation transcript between a customer and a contact center agent stemming from a call made by the customer to discuss his internet connection. Using this text, exemplary functionality is provided as to how the interaction may be processed by the personal bot 405 in order to identify unresolved or pending actions and/or take follow-up actions for the customer in relation thereto.

With specific reference to FIG. 9, text of the conversation between the customer and the agent is presented, which may be referred to as an interaction 505. It will be appreciated that, while the example includes the customer interacting with a live agent, the present functionality could also be used in situations in which the customer instead interacts with an automated process or chatbot. In the dialogue of the interaction 505, the customer is contacting the contact center to discuss a slow internet connection that he has been experiencing. The conversation progresses with the agent diagnosing the reason for the slow connection—the customer using his current plan's allotment of high-speed data—and then offering the customer an upgraded data plan that includes unlimited high-speed data. The agent tells the customer that the upgrade offer includes special discounts and free equipment if the customer agrees to enroll for a specified term. Toward the end of the interaction 505, the agent discusses with the customer several actions and time periods relevant to enrolling the customer in the upgraded plan and how long it will take for the customer to again have a high-speed data connection. The customer then agrees to enroll in the upgraded plan as offered by the agent.

It will be appreciated that, as the interaction 505 concludes, both parties to the conversation have agreed upon or suggested (or, as also used herein, "promised") a course of action that includes several actions being performed in the future. (Note: these actions, as already mentioned, will be referenced herein as "pending actions" and, generally, described as being "promised" by one of the parties in the interaction. It should be understood that the use of the term "promised" is intended broadly and may be used herein to described instances where a pending action is merely implied or recommended in a party's statements, as it may be desirable in certain embodiments to identify a pending action for follow-up where no express or binding promise is actually made.) For example, several actions have been promised by the agent (and, by extension, the business or organization the agent represents) that need to be fulfilled so that the customer, in fact, is enrolled in the upgraded plan and the high-speed data connection is delivered to him in the manner promised. As will now be discussed, embodiments of the present invention may effectuate through customer automation the performance of these pending actions.

In accordance with exemplary embodiments, once an interaction has concluded, example embodiments of the present invention (for example, via functionality associated with the personal bot 405 and/or customer automation system 300) may record and document the interaction for a customer, e.g., storing data related thereto in the customer profile module 330. For example, different aspects related to the communication may be recorded and stored, including text, voice, and/or video. The customer automation system 300 may further document the interaction by storing and indexing any messages, documents, files, and other media involved or shared during in the interaction and, thereby, provide a customer with the ability to later search this material. As an example, a customer may search for keywords spoken by an agent in order to retrieve saved audio that was spoken near the keywords. As another example, after conducting a technical support call, a customer may have the ability to recall and view an image that was shared and annotated by an agent when explaining how to set up a particular piece of equipment. A customer may then be able to view specific details of an interaction, such as the timing of particular spoken lines in the conversation and what files were being shared at the time.

In relation to the example interaction 505 of FIG. 9, the personal bot 405 may save the conversation as a transcript or recording. If saved as a recording, the recording may later be transformed to text via voice-to-text transcription. In any case, an interaction transcript of the interaction 505 may be created and saved within a database, where that database is accessible to the personal bot 405. As will now be discussed, the personal bot 405 may include analysis tools that, when applied to the interaction transcript, facilitate customer-side automation.

With specific reference to FIG. 10, the results of a first type of analysis are presented. In this case, the personal bot has analyzed the transcript from the interaction 505 and, from that analysis, recognized, inferred, and/or classified an overall "context" of the interaction and identified "intents" (i.e., the meaning or intention behind spoken phrases or word groupings), which, as will be seen, then may be used to identify pending actions. In performing this analysis, any of the methods and systems disclosed herein may be used, including the use of conventional technologies, as would occur to one of ordinary skill in the art. For example, the personal bot may have a machine learning or artificial intelligence (AI) engine that is trained with predefined set of intents that are segregated by context. Thus, the personal bot may first determine a reason or context of the customer query, i.e., the context. Upon determining the context, the analysis may proceed with segmenting and classifying the interaction transcript in accordance with a predefined set of intents that correspond to that particular context. The results of this step in the analysis are presented in FIG. 10 in a personal bot classifications 510 section, which is provided as an annotation to the interaction transcript 505.

More specifically, in relation to the example conversation of the interaction 505, the analysis of the personal bot may begin by determining a context 515, which often is found in an initial segment of the exchange in a customer's response to an agent asking the reason for the call. A trained model may be used to do this. For example, a training data set (e.g., a data set including data pertaining to prior interactions between customers and contact centers) may be used to train an NLP algorithm or model—which also may be referred to as a "context recognizer model"—and, once trained, the model may be used to recognize the context of the interaction 505. In the example provided, because the customer has called to express his frustration with his internet connection being slow, the analysis determines that the context 515 is a "slow internet connection".

As a next step of the analysis, the personal bot may retrieve a predefined list of intents that corresponds to the context, i.e., "slow internet connection". In accordance with the list of intents, the personal bot may segment the conversation and classify the segments by those intents. That is, the analysis continues with personal bot chunking or segmenting the conversation based on, for example, keywords and topics covered within particular portions or sections of the exchange. As shown, one of the segments is the one in which the context 515 of the interaction is found, with the other segments being primarily devoted to different topics within the context 515. Based on the topic or subtopics covered in each of these other segments, the personal bot then may classify each with an intent 520 selected from the predefined list. As an example, a trained model may be used to do this. For example, a training data set (e.g., a data set including data pertaining to prior interactions between customers and contact centers) may be used to train an NLP algorithm or model—which also may be referred to as a "intents recognizer model"—and, once trained, the model may be used to recognize an intent for each of the other segments. As shown in the example of FIG. 10, the intents 520 inferred for the remaining segments are referred to as "exhausted high-speed bandwidth", "selling upgrade to premium plan", and lastly, "customer accepts premium plan".

These intents 520 then may be used to identify any unresolved, outstanding, or, as referred to herein, pending actions 525. As used therein, a "pending action" is defined as any action that is agreed upon, promised, or otherwise suggested by one of the parties during an interaction, where the action is to be performed or completed after the interaction has ended. In regard to the relationship between intents and pending actions, an intent may refer to a broader action or objective, while a pending action within that intent may refer to specific actions necessary to make that broader objective happen. Thus, as will be discussed more below, one of the intents identified in FIG. 10 refers a customer's desire to enroll in a new upgraded plan. To make this intent happen, several actions must be taken, some of which may be taken care of during the interaction, with others requiring action after interaction has concluded. These actions—which have to be completed after the interaction is concluded—are the ones that present embodiments may classify as pending actions 525.

As will be appreciated, certain pending actions may regularly appear in relation to certain intents. According to example embodiments, some intents may have a predefined list of pending actions. Like the predefined list of intents that correspond to a particular context, the predefined list of pending actions may result in more accurate recognition of pending actions when a particular intent is identified.

Within an interaction, pending actions may be found in statements made by either the customer or agent, which may include chatbot representatives in place of each, and may make either party responsible for completing the action. It should be appreciated that, in the case of an agent, a pending action may be identified for actions that will be completed by other representatives or agents (i.e., not just the agent himself). That is, a pending action may be identified when the agent suggests or promises an action that will be handled by another representative of the contact center and/or enterprise, business, or organization associated with the contact center. For example, a statement by an agent saying that the agent will call the customer back at a later time creates an identifiable pending action, which is a future act performed by the agent of calling the customer back. As another example, a statement by an agent promising a service call by a technician on an upcoming day creates an identifiable pending action, which is the future act performed by the technician of completing the service call. As mentioned, customer statements can also create pending actions. For example, if the customer suggests that he will do something in the future, such as tells an agent that he will forward certain documents to the agent later in the day, this creates an identifiable pending action for the customer.

Returning to the specific example of FIG. 10, the results of the analysis demonstrate that the exemplary embodiments does not identify any pending actions 525 in the "exhausted high-speed bandwidth" intent segment. Similarly, none is identified in the "selling upgrade to premium plan" intent segment. As will be appreciated, these results generally stem from the fact that, in each case, neither the customer nor agent make statements that can be reasonably construed as suggesting or promising the completion of a specified action in the future. However, as will now be discussed, present embodiments may be configured to identify several such pending actions 525 in the "customer accepts premium plan" intent segment.

As illustrated, a first identified pending action 525 is referenced as "provide premium plan." As will be appreciated, with the customer accepting the upgrade to the premium plan, the agent's statements about what comes with the premium plan substantially creates a promise to actually provide those services. Such promised future actions may be classified as pending actions.

As further illustrated, a second identified pending action 525 is referenced as "provide free equipment". In this case, the agent makes statements regarding one or more actions that will be taken after the interaction is completed in order to provide the customer with certain free equipment (i.e., a modem and router). These statements are made contingent on the customer upgrading to the premium plan. Once the customer agrees to the upgrade, the agent's statements effectively become a promise, and the future actions related to providing the equipment becomes classified as a pending action.

A third identified pending action 525 is referenced as "restore high-speed connection". In this case, the agent makes statements regarding one or more future actions that will be taken in regard to restoring the customer's high-speed connection once the customer agrees to the premium plan upgrade. When the customer accepts the upgrade, the agent's statements effectively become a promise, and the future actions required to restore the customer's high-speed connection is classified as a pending action.

A fourth such pending action 525 is referenced as "stay enrolled in premium plan". In this case, the pending action is on the customer-side of the interaction. That is, once the customer has accepted the upgrade, he has agreed to provide payment for the services, as necessary, over the term of the agreement. Thus, once the customer accepts the upgrade, the future action of paying for those services and staying enrolled becomes classified as a pending action.

With reference now to FIG. 11, with several pending actions 525 identified, embodiments of the present invention may proceed with identifying corresponding target timeframes 530. As used herein, a target timeframe 530 is a time period or deadline associated with the performance or fulfilment of the pending action 525 to which it corresponds. As discussed more below, once identified, a target timeframe 530 may be used to orchestrate the timing of automated follow-up actions by the personal bot on behalf of the customer.

The analysis for identifying a target timeframe may include natural language processing via a trained model or neural network, which may include key word or phrase spotting, particularly within the portion of the transcript in which the corresponding pending action 525 is identified. In example embodiments, however, the present invention may include a target timeframe recognizer model that recognizes relevant timeframe language associated or used in conjunction with the pending actions 525. For example, the interaction transcript may be analyzed by a target timeframe recognizer model, with the model outputting a target timeframe 525 for each previously identified pending action 525. In accordance with an exemplary embodiment, a training data set (e.g., a data set including data pertaining to prior interactions between customers and contact centers) is used to train the target timeframe recognizer model.

The present system and methods used to identify target timeframes may be configured to recognize several different types, allowing for the necessary flexible for consistent use across a variety of situations. As will now be discussed, these categories may include: a) definite target timeframes; b) deducible target timeframes; and c) indefinite target timeframes.

In regard to the category of definite target timeframes, this classification includes those timeframes that are stated in the interaction transcript a straightforward or direct or non-ambiguous way. Examples of these types of target timeframes are found in the following statements:

"Your request will be processed within 24 hours."
"Your payment will be credited in the next 6 hours."
"All our technical experts are currently busy, but we can assign someone to call you back within the next 2 hours."
"We are still working on the problem and will probably get back to you in another hour."
"It will take us about 2 hours to verify your documents."

"Your complaint is already filed, and it will be resolve it in the next 2 business days."

In each of these examples, a distinct and specific timeframe is mentioned in relation to the performance of some action in the future. System and methods of the present invention may be trained to recognize and decipher these types such timeframes so that a target timeframe is assigned to each identified pending action.

In regard to the next category, deducible target timeframes, as used herein, are those timeframes that become clear and distinct with some additional information. In such cases, the pending action may be clear stated, but the target timeframe is not expressed in a clear or numerical way, as in the example above. That is, some further learned intelligence must be applied in these cases to determine an appropriate target timeframe for the pending action. Examples of these types of timeframes are found in the following statements:

"Please check back during business hours."
"I can check if there are better deals for you during Thanksgiving holidays."
"Christmas week is the right time for you to check back regarding this."
"The issue needs one of our skilled technical experts. You can expect a positive update after the holidays."

In these examples, while the exact timeframe may not be stated directly, it may be deduced if the input text is syntactically handled correctly and/or additional information is acquired. For example, in the first example, the personal bot may need to search and find the relevant "business hours" information and, once this is known, the target timeframe for calling back can be known. In the next three examples, the personal bot may pinpoint a specific target timeframe once the dates for the referenced holidays are known.

In regard to the category of indefinite timeframes, as used herein, these are those timeframes that are defined in accordance with less definitive or vague language. That is, statements made in the interaction reference to a timeframe, however the language used to describe that timeframe is open to some interpretation. Examples of these types of are found in the following statements:

"The item will be on stock in few days."
"This whole week is crazy, but just give me more time and I will get it done."
"The product is currently not in stock. You should call us back later."
"I will check with my manager and get back to you soon."

In regard to these examples, the target timeframe recognizer model may be trained to infer an approximate timeframe or deadline for completing a pending action given an analysis of the interaction script. In training the model, the system may analyze similar contexts to predict appropriate ranges for such indefinite timeframes. Such models may be further improved when input is received from the customer to confirm assumptions made by the model. That is, the customer may be asked to confirm the timing of a follow-up action by the personal bot. The customer may choose to modify the deduced timeframe. The modified timeframe may then be used to update the target timeframe recognizer model so that the model learns and adepts. This may be done on a per customer basis or applied more globally. In ambiguous cases, the target timeframe for a pending action may be confirmed via a prompt and question to the customer via the customer device.

Returning to the specific example of FIG. 11, the analysis results in identifying target timeframes 530 for each of the pending actions 525. Thus, in regard to the first pending action 530—entitled "provide premium plan"—the target timeframe 520 is identified as "2 YEARS". This two-year period reflects the time the internet provider has promised to provide the customer with unlimited high-speed data per the premium plan. In regard to the second pending action 530—entitled "provide free equipment"—the target timeframe 530 is identified as "2 BUSINESS DAYS". This period reflects the time in which the agent promised delivery and installation of the free modem and router. In regard to the third pending action 530—entitled "restore high-speed connection"—the target timeframe 530 is identified as "20 MINUTES". This period reflects the time the agent stated it would take for the customer to again have a high-speed connection if he signed up for the premium plan. And, finally, in regard to the fourth pending action 530—entitled "stay enrolled in premium plan"—the target timeframe 530 is identified as "2 YEARS". This period reflects the time that the customer promised to stay enrolled in the premium plan.

According the exemplary embodiments, the personal bot 405 may use the identified pending actions and target timeframes to automate the performance of follow-up actions on behalf of the customer. The follow-up actions may be actions intended or anticipated to help move a pending action toward a resolution or completion. In some embodiments, the personal bot may develop a follow-up workflow in which one or more follow-up actions are scheduled in relation to the target timeframe.

For example, in accordance with present embodiments, the follow-up action may take the form of a reminder, notification, inquiry, or offer to help made to the customer pertaining to a promise made to the customer by the agent during a previous interaction. As an example, the personal bot may provide a voice or text message to the customer stating: "John, Walmart said it would be calling you back today regarding the return request of your previous order."

The personal bot may present this type of reminder with other automated follow-up actions that the customer can then decide to use. First, the personal bot may offer to automate the process of connecting to the customer to the enterprise, for example, "John, do you want me to start this interaction with Walmart for you now?" Second, the personal bot, when possible, may offer to handle the entire interaction for the customer, for example, "John, would you like me to handle this interaction with Walmart for you?" Third, the personal bot may simply provide a link with the initial question that, when activate by the customer, calls or otherwise contacts the enterprise to begin an interaction that the customer then handles, for example, "Activate the following link [CHAT LINK] to begin a chat session with Walmart" or "Activate the following link [PHONE NUMBER LINK] to place a call to Walmart."

As another example, in accordance with present embodiments, the follow-up action may take the form of a reminder, notification, inquiry, or offer to help made to the customer pertaining promises made by the customer to an agent during a previous interaction. Thus, when the customer has mentioned an action for himself in an interaction, the personal bot can help by later reminding him of this. For example, the personal bot may provide a voice or text message to the customer stating: "John, you told American Express you would get back to them today in regard to your expired credit card." As another example, "John, you needed to send your address proofs to Y bank within 24 hours. Shall we send it now? Or should I remind you later?" As with the above, the personal bot may present this type of reminder with offers relating to other automated follow-up actions that the customer can then decide to use.

Now, with specific reference again to FIG. 11, when this type of functionality is applied to the example interaction 505, several types of notifications and offers to help may be communicated to the customer.

For example, after 20 minutes has passed since the end of the interaction 505, the personal bot may remind the customer that his high-speed connection should be restored and then inquire whether this has happened yet. If it has not happened, other follow-up actions facilitating another or subsequent interaction with the contact center may be suggested and then performed by the personal bot once permission to do so is received from the customer to do so.

As another example, after two business days have passed since the end of the interaction 505, the personal bot may remind the customer that his free equipment should have been delivered and installed and then inquire as to whether this has taken place yet. If it has not happened, other follow-up actions facilitating another or subsequent interaction with the contact center may be suggested and then performed by the personal bot once permission to do so is received from the customer.

As another example, near the end of the two-year enrollment term for the premium plan, the personal bot may remind the customer that the end of the term is nearing and inquire as to any actions the customer may want to take, e.g., provide notice terminating the plan at the end of the specified term, consider other service options that the personal bot could present to the customer, etc. On the other side, the personal bot, when appropriate, may remind the customer about his obligations under the premium plan once he accepted it. These may include reminders regarding the due date of the monthly fee or, if the customer began researching a new internet provider, remind him of the term remaining on his current premium plan and/or advise him as to any applicable fees or penalties for early termination. In this way, the follow-up actions of the present invention may serve to both remind the customer of pending actions from previous interactions and facilitate the fulfilment of the underlying promised actions.

As another example, present invention may include a computer-implemented method for automating actions for a customer in relation to an interaction between the customer and an agent of a contact center, wherein the interaction may include an exchange of statements made by the customer and the agent. The method may include the steps of: receiving at least a transcript of the interaction; via a first analysis, analyzing the transcript of the interaction; from results of the first analysis, identifying: a pending action, wherein the pending action comprises an action promised by the customer or the agent that will be resolved after the interaction; and a target timeframe for resolving the pending action; given the pending action, determining a follow-up workflow that may include one or more follow-up actions, each of the one or more follow-up actions including an action intended to assist the customer to resolve the pending action; and automatically executing the one or more follow-up actions.

According to exemplary embodiments, the follow-up workflow may include a workflow schedule including one or more predetermined times for automatically executing respective ones of the one or more follow-up actions. The one or more predetermined times may be determined in relation to the target timeframe of the pending action.

According to exemplary embodiments, the one or more follow-up actions may include a first follow-up action.

According to exemplary embodiments, the first follow-up action may include generating a first user interface on a display of the customer device, wherein the first user interface may be configured to communicate a notification related to the pending action to the customer.

According to exemplary embodiments, the pending action may include an action promised by the agent, and the notification may communicate a reminder to the customer of the action promised by the agent.

According to exemplary embodiments, the pending action may include an action promised by the customer, and the notification may communicate a reminder to the customer of the action promised by the customer, and the notification may communicate a reminder to the customer of the pending action.

According to exemplary embodiments, the notification may include a link to a relevant portion of the transcript of the interaction in which the pending action may be discussed. According to exemplary embodiments, the notification may communicate to the customer a period of time remaining in the target timeframe given a current time.

According to exemplary embodiments, the one or more predetermined times may include a first predetermined time that corresponds to the first follow-up action. The first predetermined time may be configured to coincide with an expiration of the target timeframe.

According to exemplary embodiments, the one or more follow-up actions may include a second follow-up action. The second follow-up action may include an action facilitating a subsequent interaction between the customer and the contact center. According to exemplary embodiments, the second follow-up action may include automating the process by which the customer connects with the contact center to initiate the subsequent interaction. According to exemplary embodiments, the second follow-up action may include providing a link that, upon activating, is configured to open a communication channel with the contact center to initiate the subsequent interaction. According to exemplary embodiments, the second follow-up action may include navigating an automated system of the contact center for establishing contact therewith. According to exemplary embodiments, the second follow-up action may include contacting the contact center and performing the subsequent interaction on behalf the customer.

According to exemplary embodiments, the performing the subsequent interaction on behalf of the customer may include posing an inquiry pertaining to the pending action to one of the one or more agents of the contact center. According to exemplary embodiments, the performing the subsequent interaction on behalf of the customer further may include receiving an answer to the inquiry from the one of the one or more agents. The method may further include the step of delivering the answer to the customer. According to exemplary embodiments, the performing the subsequent interaction on behalf of the customer may include delivering a document pertaining to the pending action to the contact center. According to exemplary embodiments, the performing the subsequent interaction on behalf of the customer may include requesting and receiving a document pertaining to the pending action from the contact center.

According to exemplary embodiments, the first analysis may include using one or more natural language processing neural networks to: determine a context of the transcript; classify a segment of the transcript with an intent selected from a predefined list of intents that corresponds to the context; given the intent, identify the pending action in the segment of the transcript; and determine a target timeframe for the pending action. In regard to the determining the target timeframe, the one or more natural language processing neural networks may be trained to identify three classifications of target timeframes, including definite target timeframes, deducible target timeframes, and indefinite target timeframes. According to exemplary embodiments, the one or more natural language processing neural networks may be trained by feedback from the customer in regard to the indefinite target timeframes.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for automating actions for a customer in relation to an interaction between the customer and an agent of a contact center, wherein the interaction comprises an exchange of statements made by the customer and statements made by the agent, the method comprising:
   receiving at least a transcript of the interaction;
   via a first analysis, analyzing the transcript of the interaction;
   from results of the first analysis, identifying:
      a pending action, wherein the pending action comprises an action promised by the customer or the agent that will be resolved after the interaction; and
      a target timeframe for resolving the pending action;
   given the pending action, determining a follow-up workflow that includes one or more follow-up actions, each of the one or more follow-up actions comprising an action intended to assist the customer to resolve the pending action; and
   automatically executing the one or more follow-up actions.

2. The method according to claim 1, wherein the follow-up workflow includes a workflow schedule comprising one or more predetermined times for automatically executing respective ones of the one or more follow-up actions, the one or more predetermined times being determined in relation to the target timeframe of the pending action;
   wherein the one or more follow-up actions comprises a first follow-up action that includes generating a first user interface on a display of the customer device, the first user interface being configured to communicate a notification related to the pending action to the customer.

3. The method according to claim 2, wherein the pending action comprises an action promised by the agent; and wherein the notification communicates a reminder to the customer of the action promised by the agent.

4. The method according to claim 2, wherein the pending action comprises an action promised by the customer; and wherein the notification communicates a reminder to the customer of the action promised by the customer.

5. The method according to claim 2, wherein the notification communicates a reminder to the customer of the pending action; and
   wherein the notification communicates to the customer a period of time remaining in the target timeframe given a current time.

6. The method according to claim 5, wherein the notification comprises a link to a relevant portion of the transcript of the interaction in which the pending action is discussed; and
   wherein:
      the one or more predetermined times comprises a first predetermined time that corresponds to the first follow-up action; and
      the first predetermined time is configured to coincide with an expiration of the target timeframe.

7. The method according to claim 5, wherein the one or more follow-up actions comprises a second follow-up action; and
   wherein the second follow-up action comprises an action facilitating a subsequent interaction between the customer and the contact center.

8. The method according to claim 7, wherein the second follow-up action comprises automating the process by which the customer connects with the contact center to initiate the subsequent interaction, wherein the second follow-up action includes providing a link that, upon activating, is configured to open a communication channel with the contact center to initiate the subsequent interaction.

9. The method according to claim 7, wherein the second follow-up action comprises automating the process by which the customer connects with the contact center to initiate the subsequent interaction, wherein the second follow-up action includes navigating an automated system of the contact center for establishing contact therewith.

10. The method according to claim 7, wherein the second follow-up action comprises contacting the contact center and performing the subsequent interaction on behalf the customer.

11. The method according to claim 10, wherein the contact center has one or more agents; and
    wherein the performing the subsequent interaction on behalf of the customer comprises posing an inquiry pertaining to the pending action to one of the one or more agents of the contact center.

12. The method according to claim 11, wherein the performing the subsequent interaction on behalf of the customer further comprises receiving an answer to the inquiry from the one of the one or more agents;
    further comprising the step of delivering the answer to the customer.

13. The method according to claim 10, wherein the contact center has one or more agents; and
    wherein the performing the subsequent interaction on behalf of the customer comprises delivering a document pertaining to the pending action to the contact center.

14. The method according to claim 10, wherein the contact center has one or more agents; and wherein the performing the subsequent interaction on behalf of the customer comprises requesting and receiving a document pertaining to the pending action from the contact center.

15. The method according to claim 5, wherein the first analysis comprises using one or more natural language processing neural networks to:
   determine a context of the transcript;
   classify a segment of the transcript with an intent selected from a predefined list of intents that corresponds to the context;
   given the intent, identify the pending action in the segment of the transcript; and
   determine a target timeframe for the pending action.

16. The method according to claim 15, wherein, in regard to the determining the target timeframe, the one or more natural language processing neural networks is trained to identify three classifications of target timeframes, including definite target timeframes, deducible target timeframes, and indefinite target timeframes; and
   wherein the one or more natural language processing neural networks is trained by feedback from the customer in regard to the indefinite target timeframes.

17. A system for automating actions for a customer in relation to an interaction between the customer and an agent of a contact center, wherein the interaction comprises an exchange of statements made by the customer and statements made by the agent, the system comprising:
   a hardware processor; and
   a machine-readable storage medium on which is stored instructions that cause the hardware processor to execute a process, wherein the process comprises the steps of:
      receiving at least a transcript of the interaction;
      via a first analysis, analyzing the transcript of the interaction;
      from results of the first analysis, identifying:
         a pending action, wherein the pending action comprises an action promised by the customer or the agent that will be resolved after the interaction; and
         a target timeframe for resolving the pending action;
      given the pending action, determining a follow-up workflow that includes one or more follow-up actions, each of the one or more follow-up actions comprising an action intended to assist the customer to resolve the pending action; and
      automatically executing the one or more follow-up actions.

18. The system according to claim 17, wherein the follow-up workflow includes a workflow schedule comprising one or more predetermined times for automatically executing respective ones of the one or more follow-up actions, the one or more predetermined times being determined in relation to the target timeframe of the pending action; and
   wherein the one or more follow-up actions comprises a first follow-up action that includes generating a first user interface on a display of the customer device, the first user interface being configured to communicate a notification related to the pending action to the customer.

19. The system according to claim 18, wherein the pending action comprises an action promised by the agent; and
   wherein the notification communicates a reminder to the customer of the action promised by the agent.

20. The system according to claim 18, wherein the pending action comprises an action promised by the customer; and
   wherein the notification communicates a reminder to the customer of the action promised by the customer.

21. The system according to claim 18, wherein the notification communicates a reminder to the customer of the pending action; and
   wherein the notification communicates to the customer a period of time remaining in the target timeframe given a current time.

22. The system according to claim 21, wherein the one or more follow-up actions comprises a second follow-up action; and
   wherein the second follow-up action comprises an action facilitating a subsequent interaction between the customer and the contact center.

23. The system according to claim 22, wherein the second follow-up action comprises automating the process by which the customer connects with the contact center to initiate the subsequent interaction.

24. The system according to claim 22, wherein the second follow-up action comprises contacting the contact center and performing the subsequent interaction on behalf the customer.

25. The system according to claim 24, wherein the contact center has one or more agents; and
   wherein the performing the subsequent interaction on behalf of the customer comprises:
      posing an inquiry pertaining to the pending action to one of the one or more agents of the contact center; and
      receiving an answer to the inquiry from the one of the one or more agents;
   further comprising the step of delivering the answer to the customer.

26. The system according to claim 24, wherein the contact center has one or more agents; and
   wherein the performing the subsequent interaction on behalf of the customer comprises requesting and receiving a document pertaining to the pending action from the contact center.

27. The system according to claim 21, wherein the first analysis comprises using one or more natural language processing neural networks to:
   determine a context of the transcript;
   classify a segment of the transcript with an intent selected from a predefined list of intents that corresponds to the context;
   given the intent, identify the pending action in the segment of the transcript; and
   determine a target timeframe for the pending action.

* * * * *